Dec. 15, 1936.    G. T. JOHNSON    2,064,476
ABRADING MACHINE
Filed July 25, 1931    15 Sheets-Sheet 3
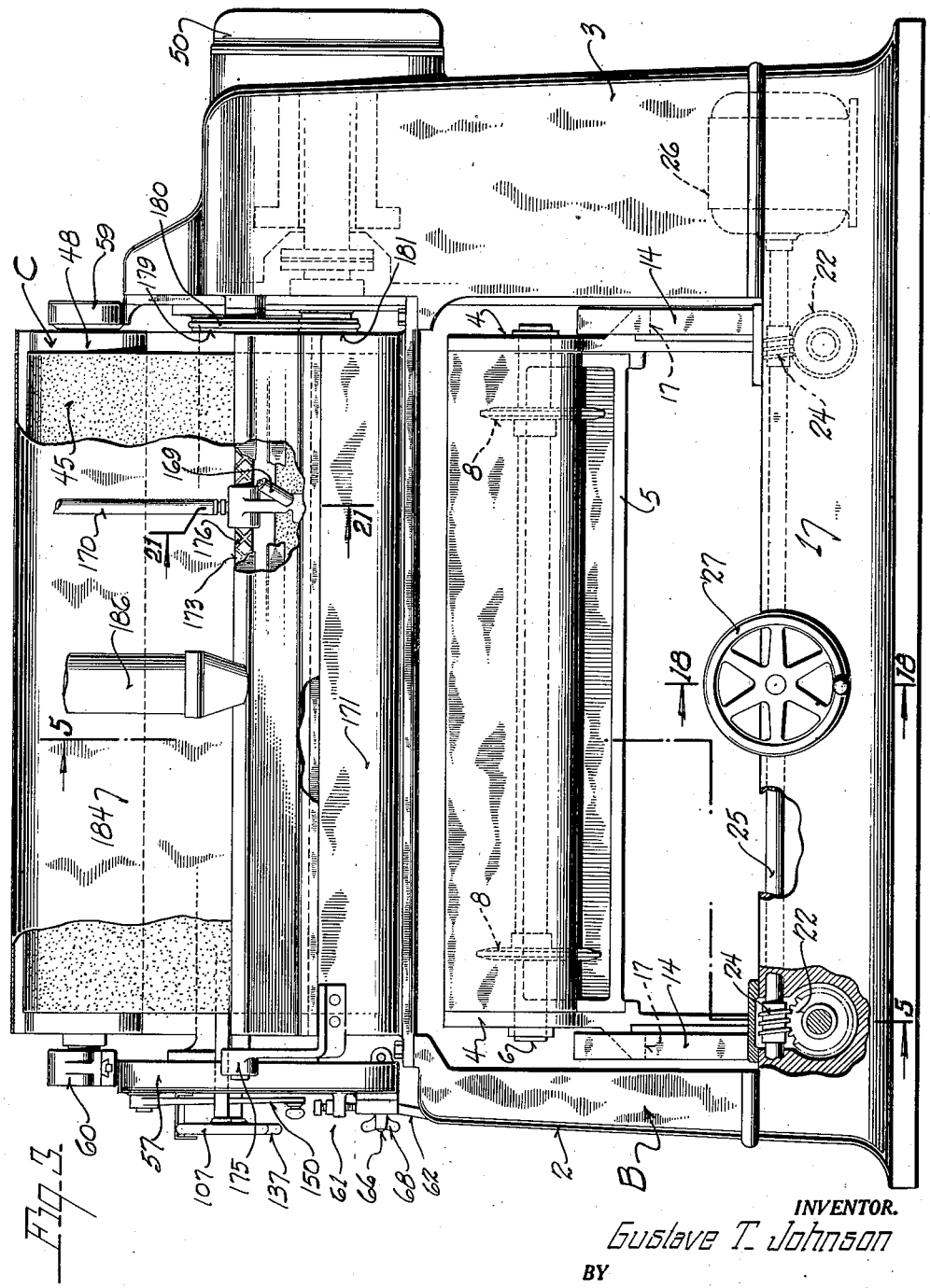
INVENTOR.
Gustave T. Johnson
BY
Ira Milton Jones
ATTORNEY.

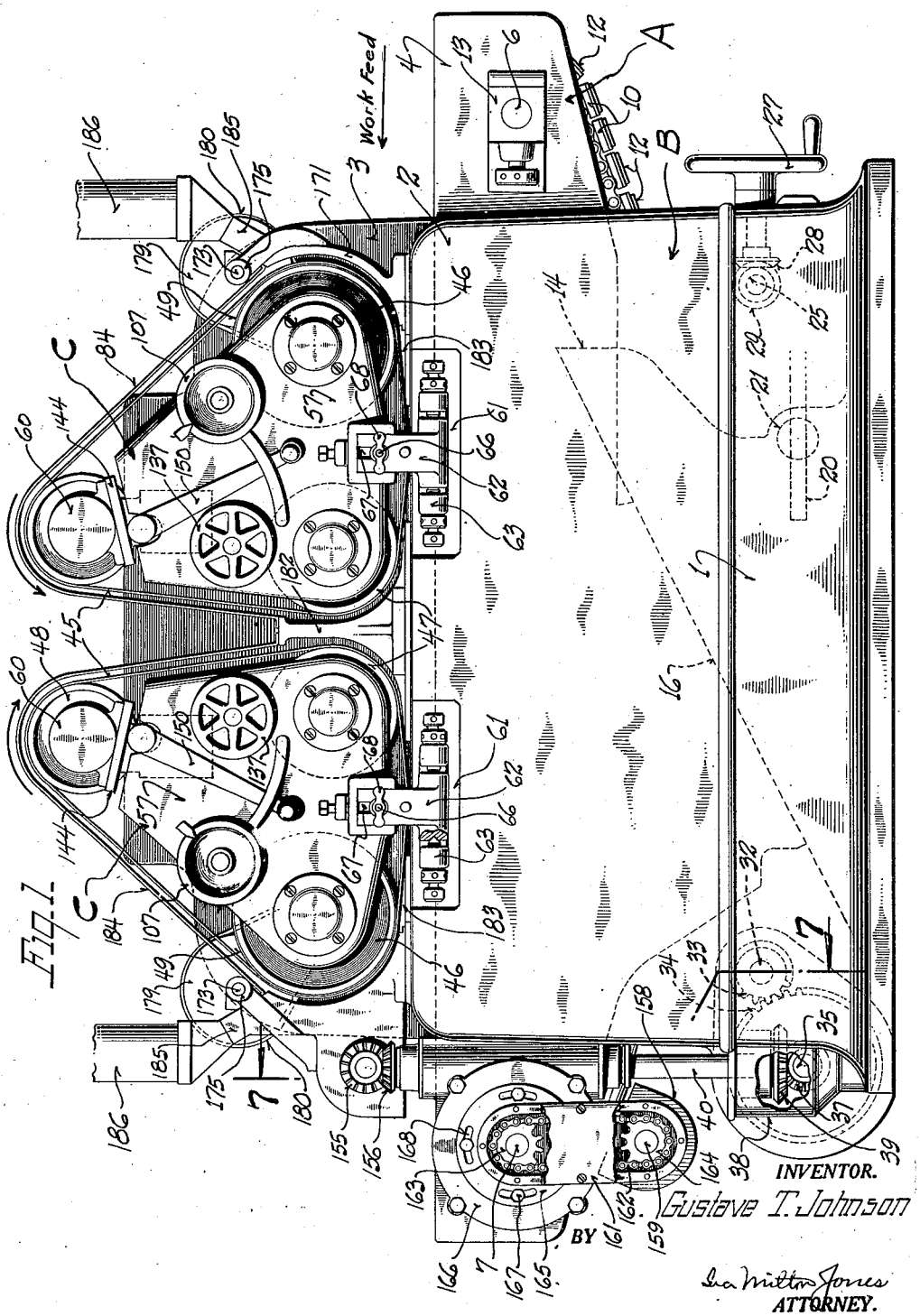

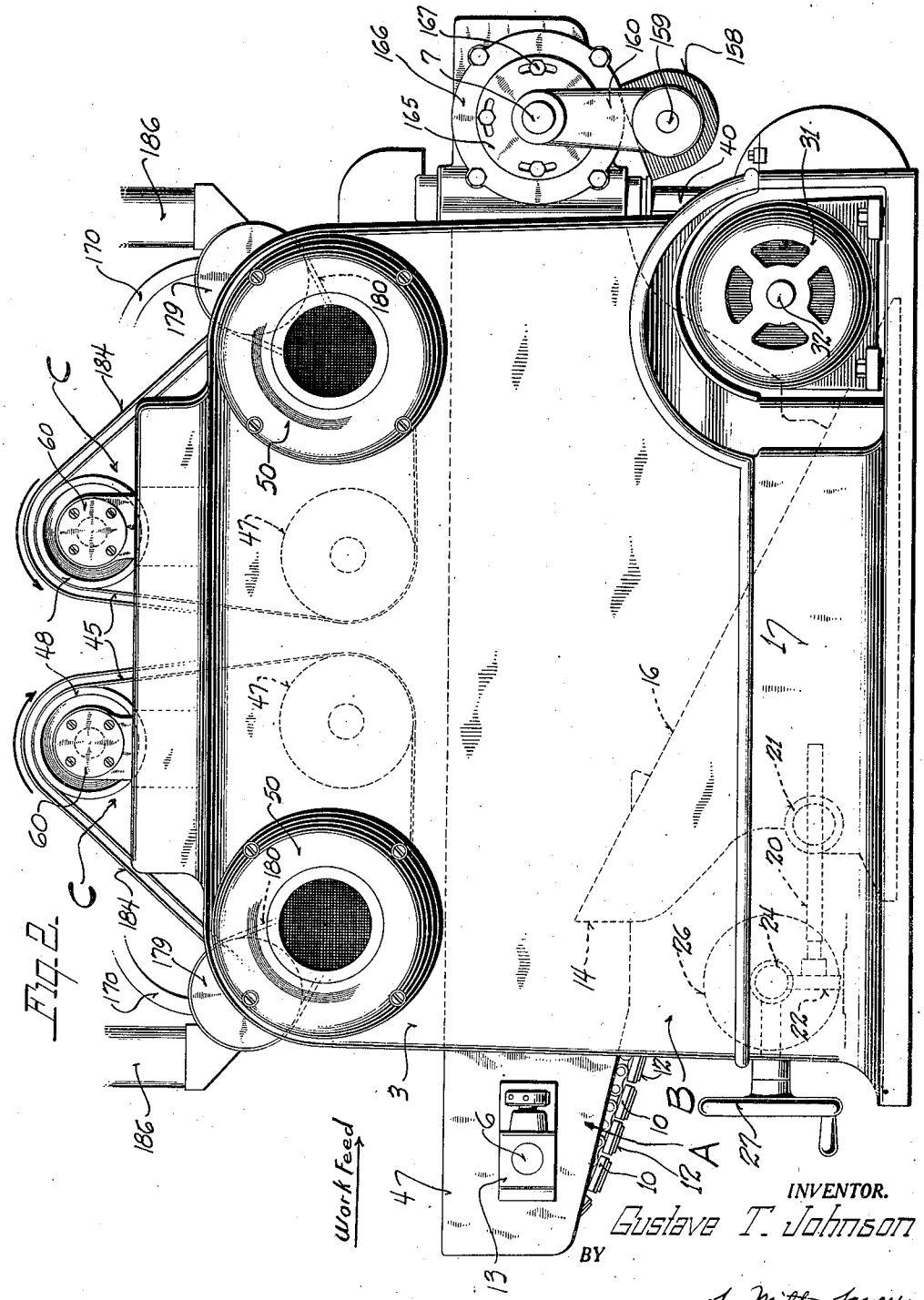

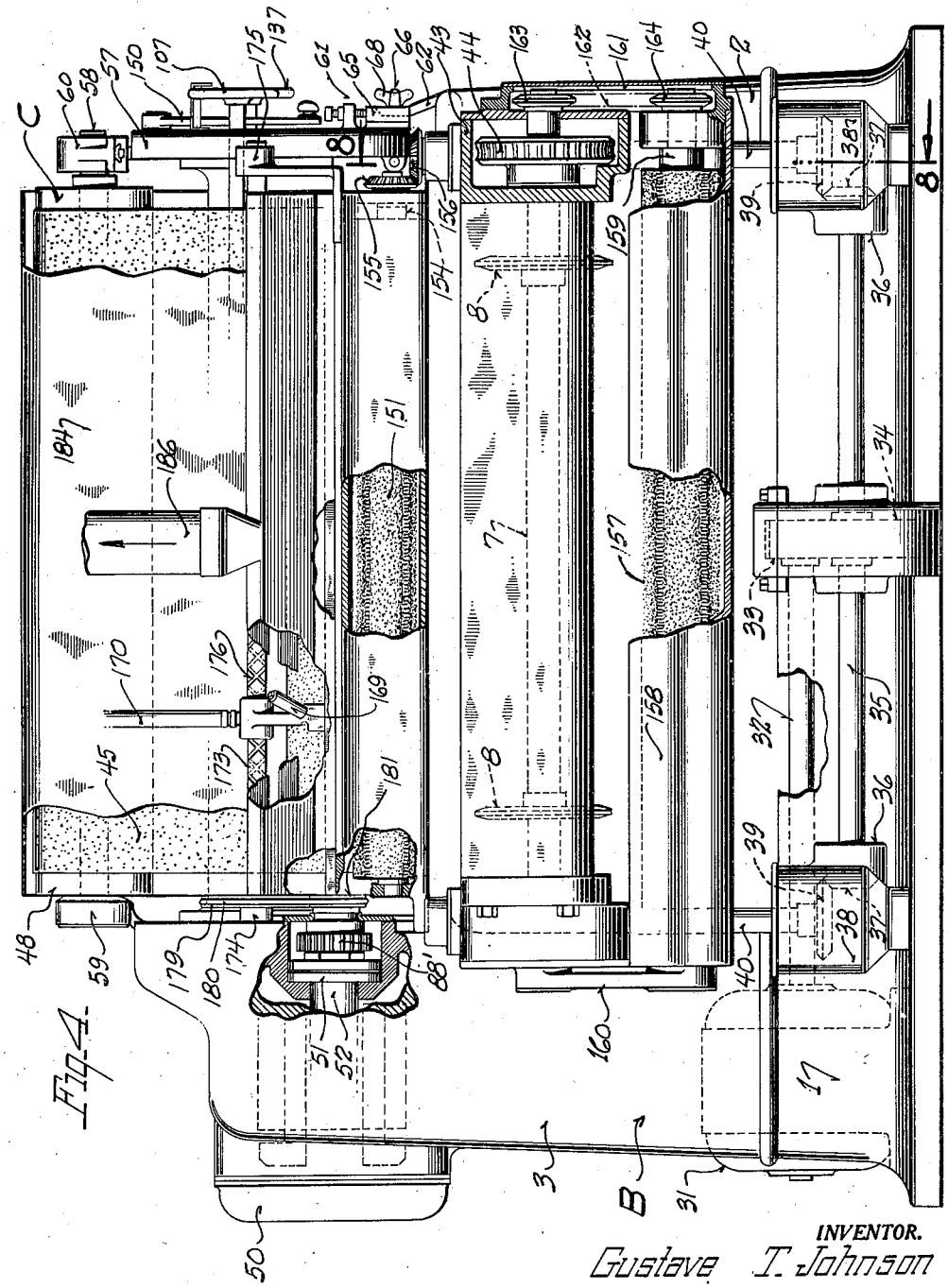

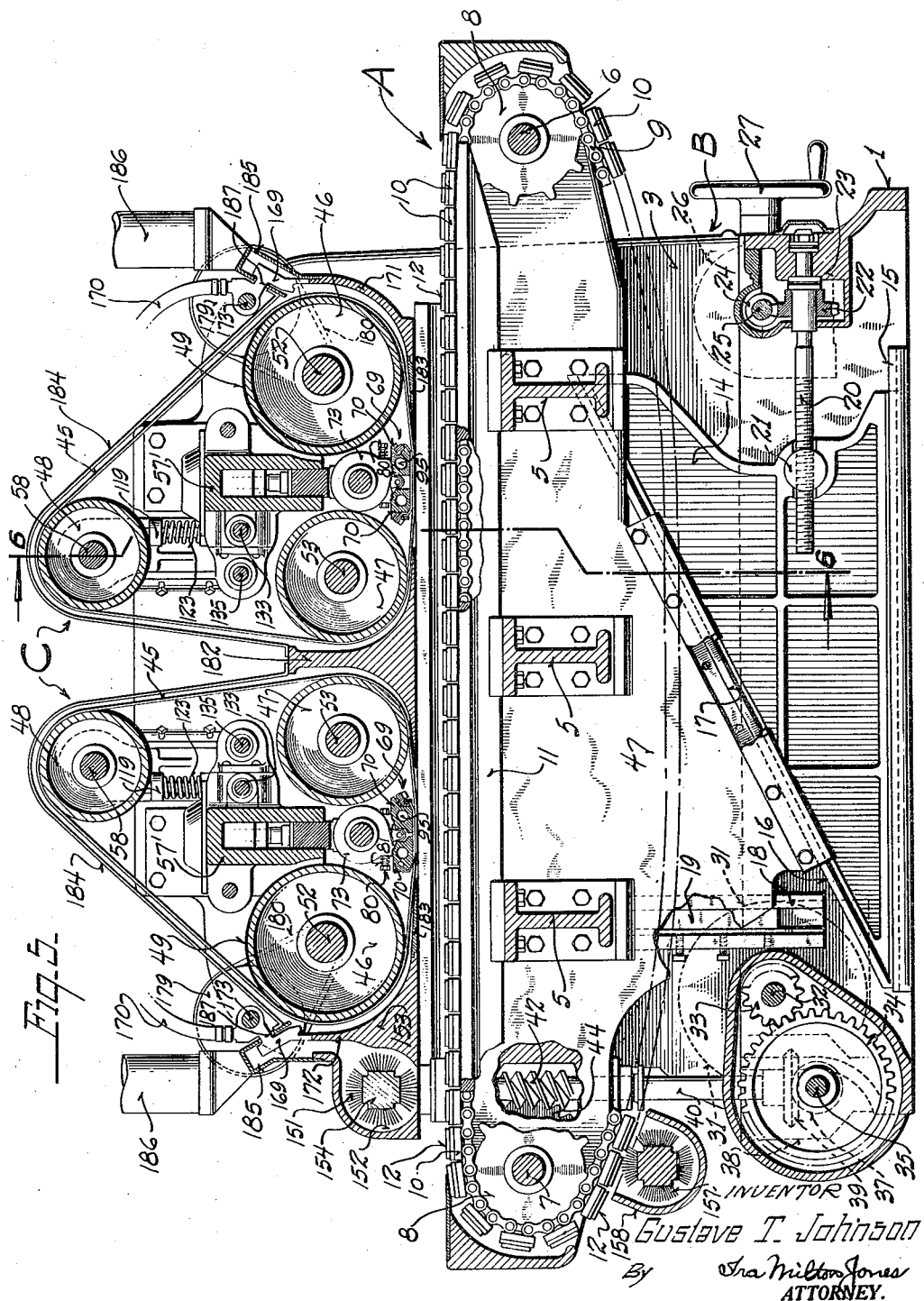

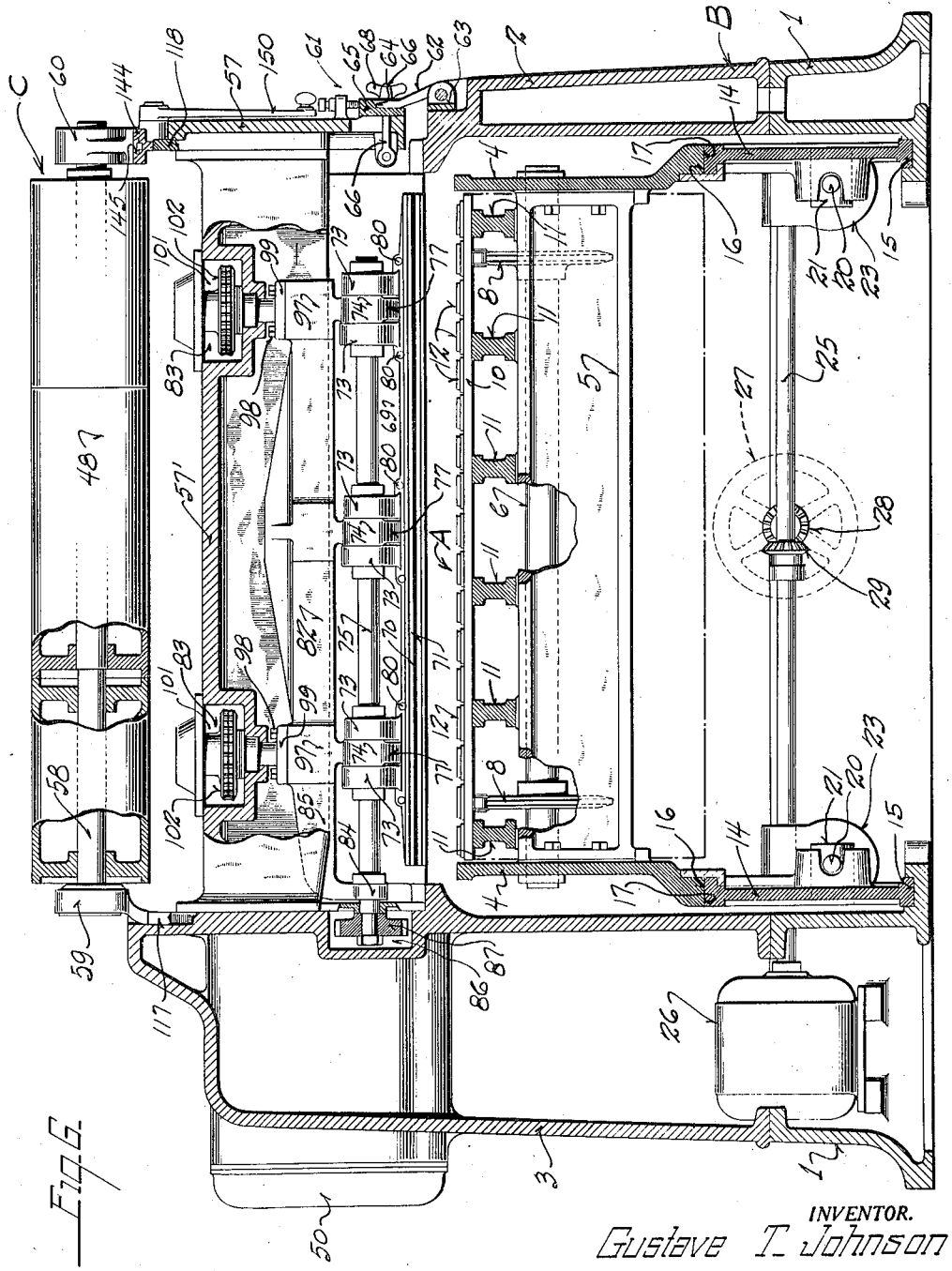

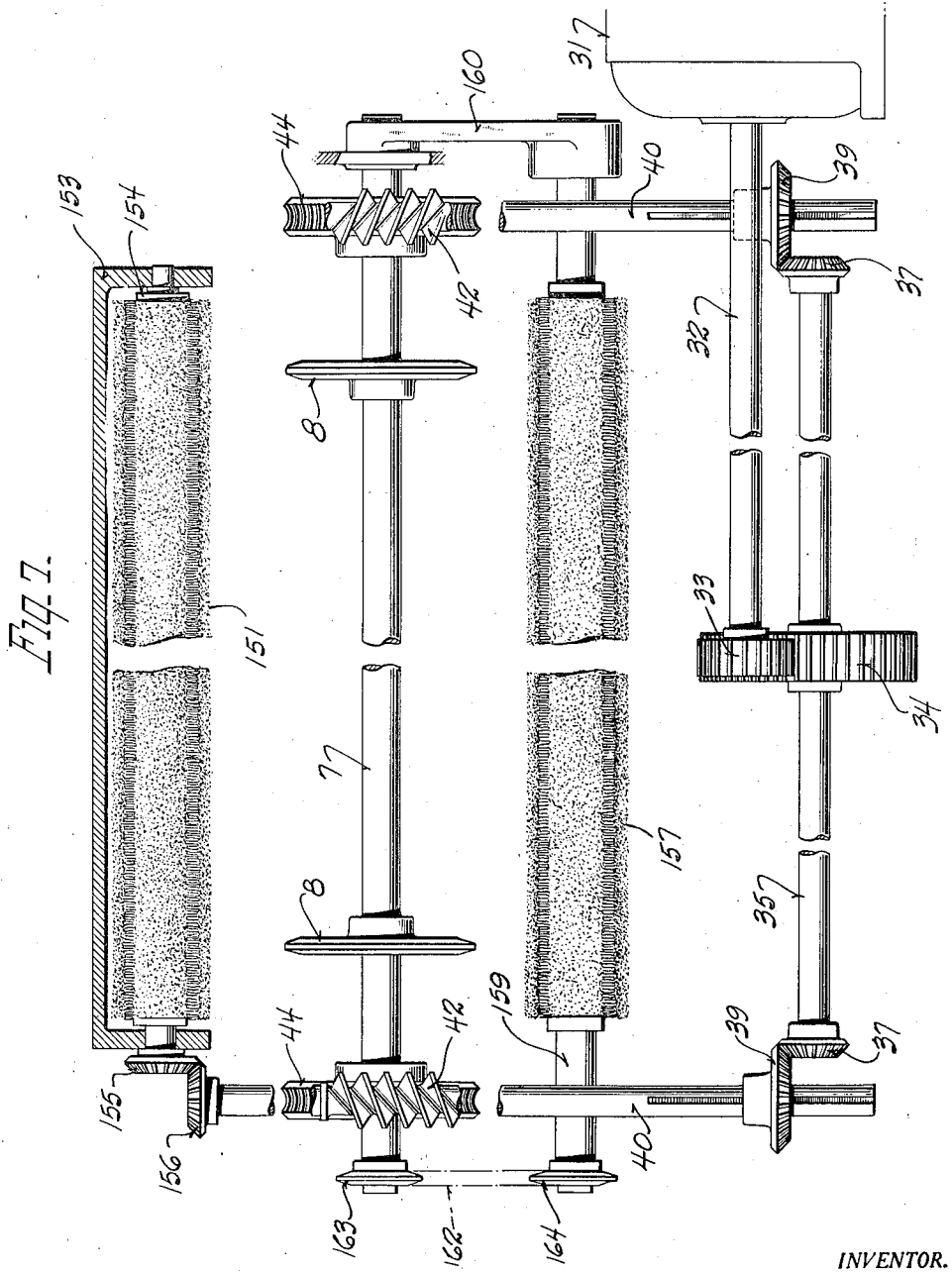

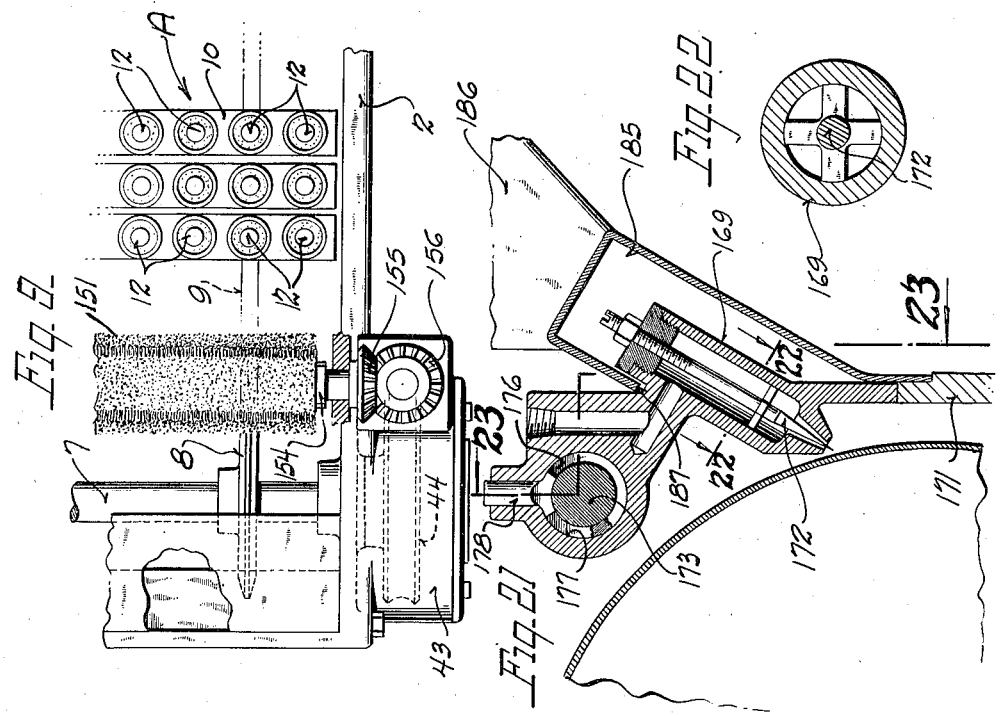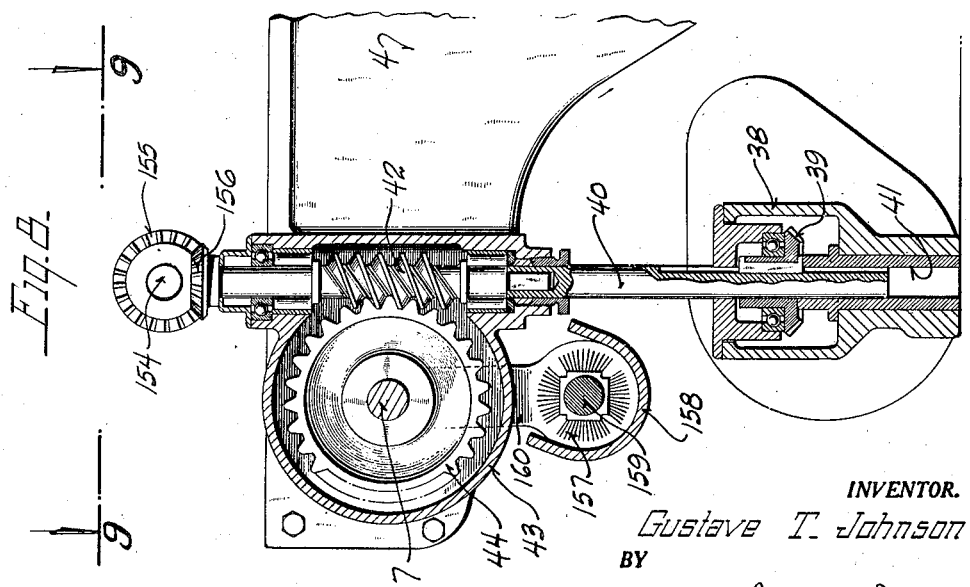

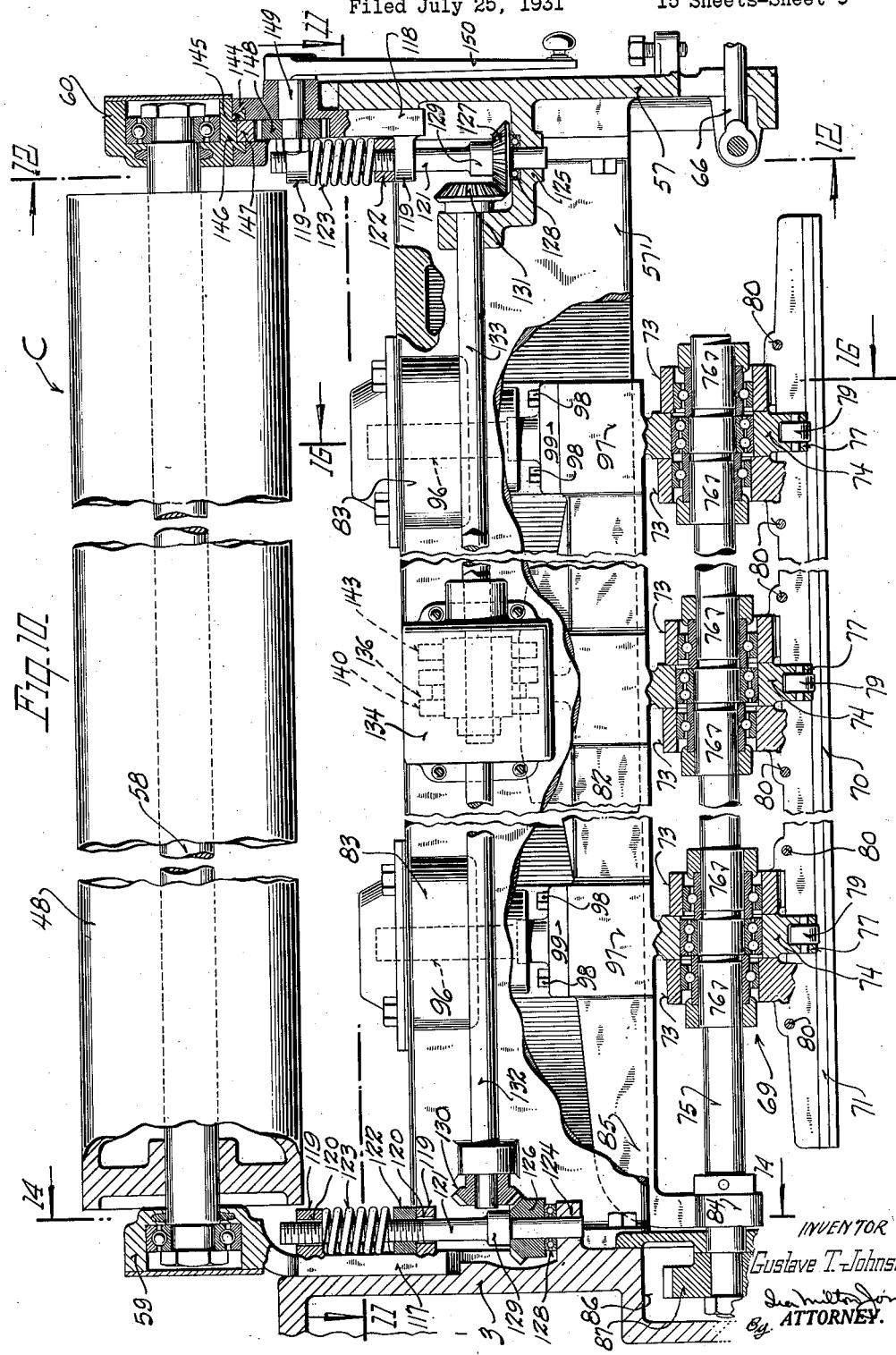

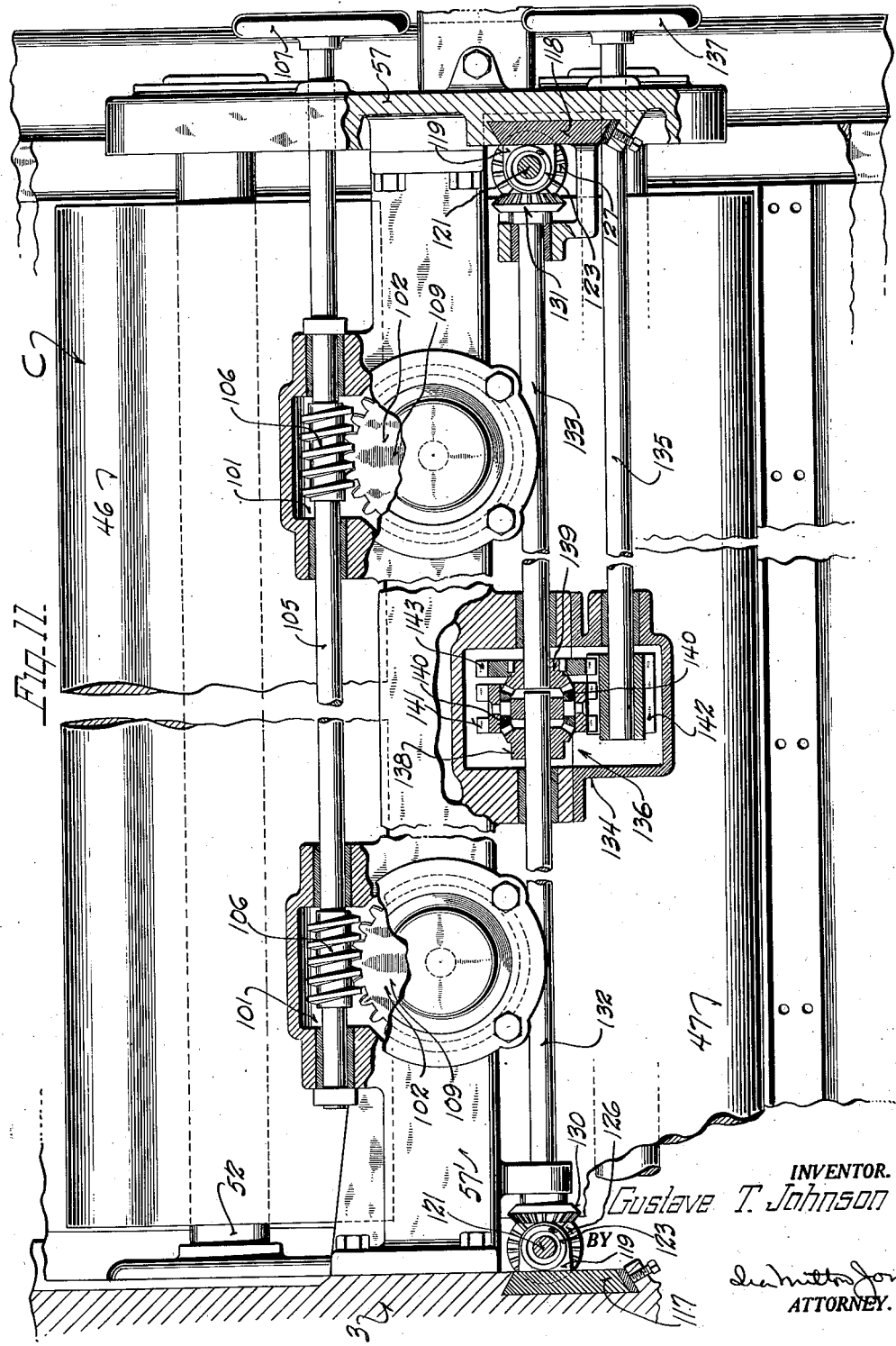

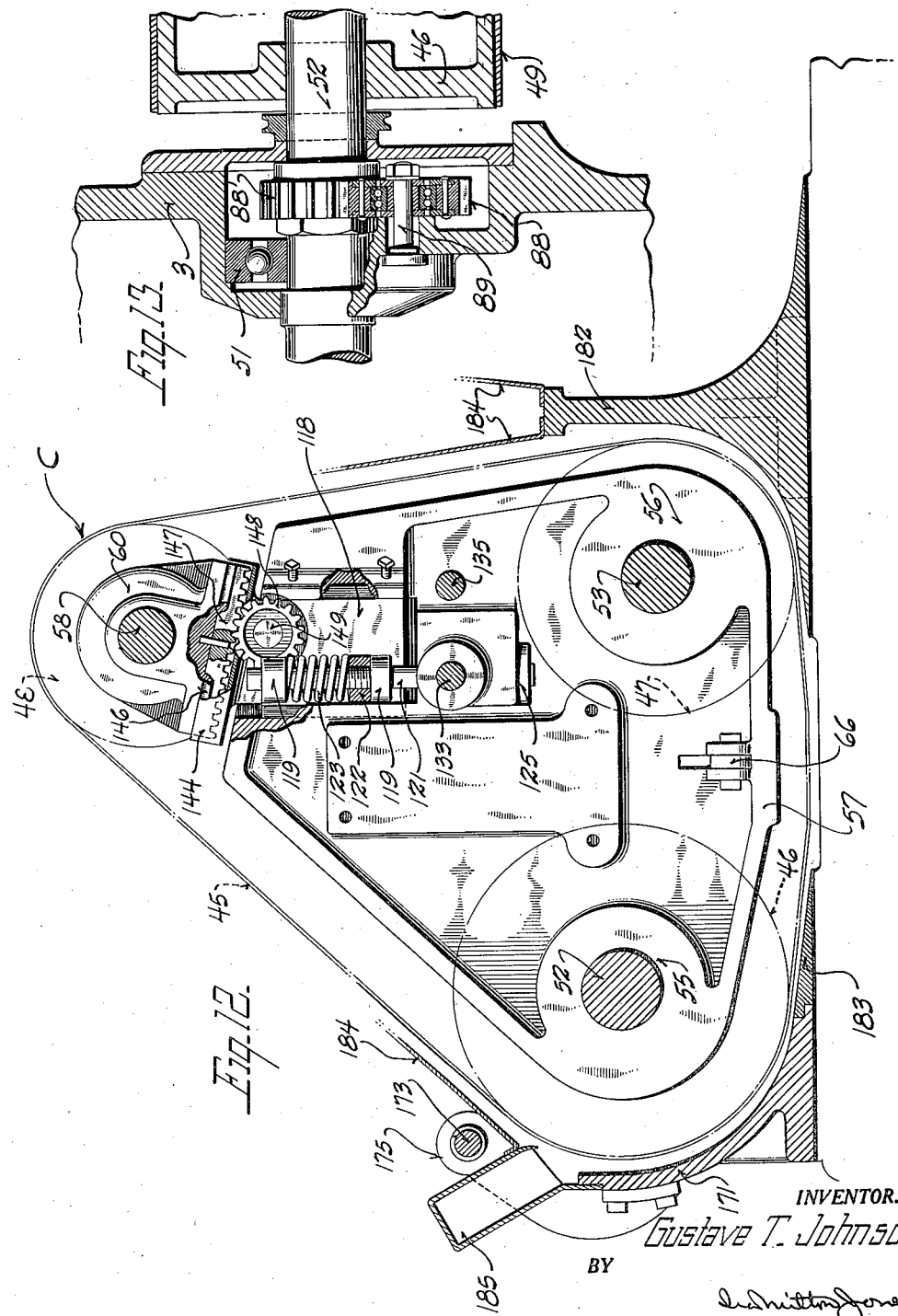

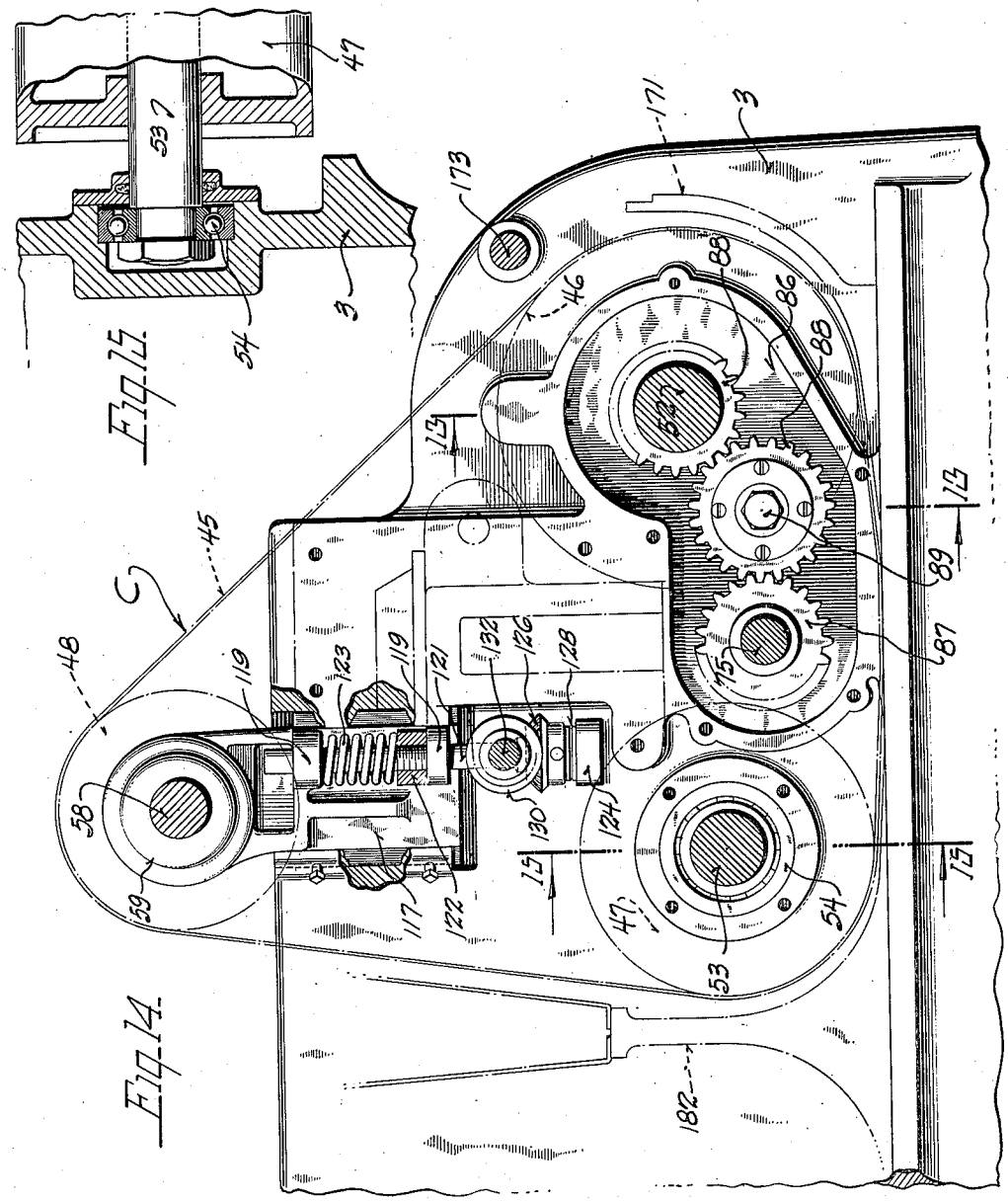

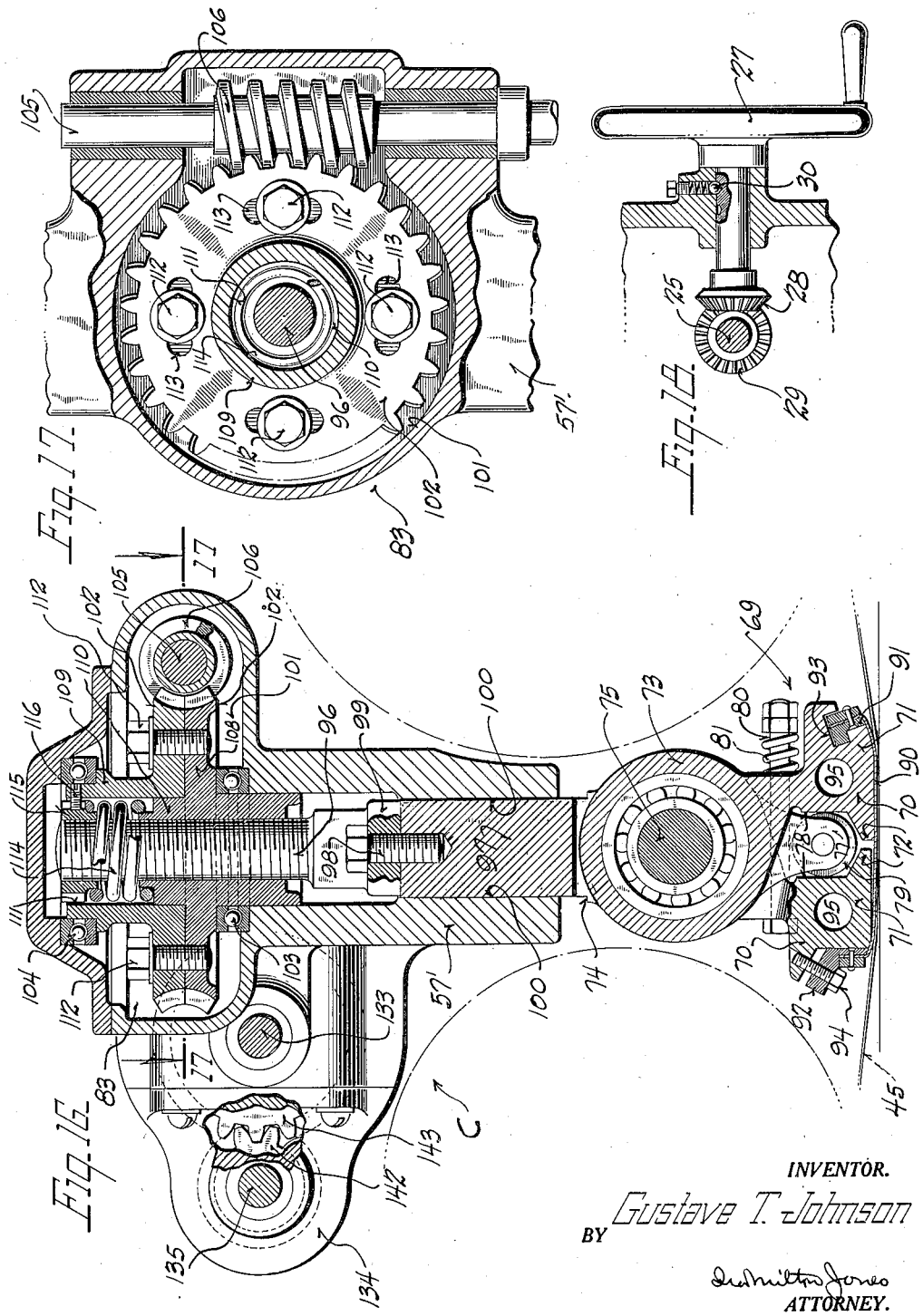

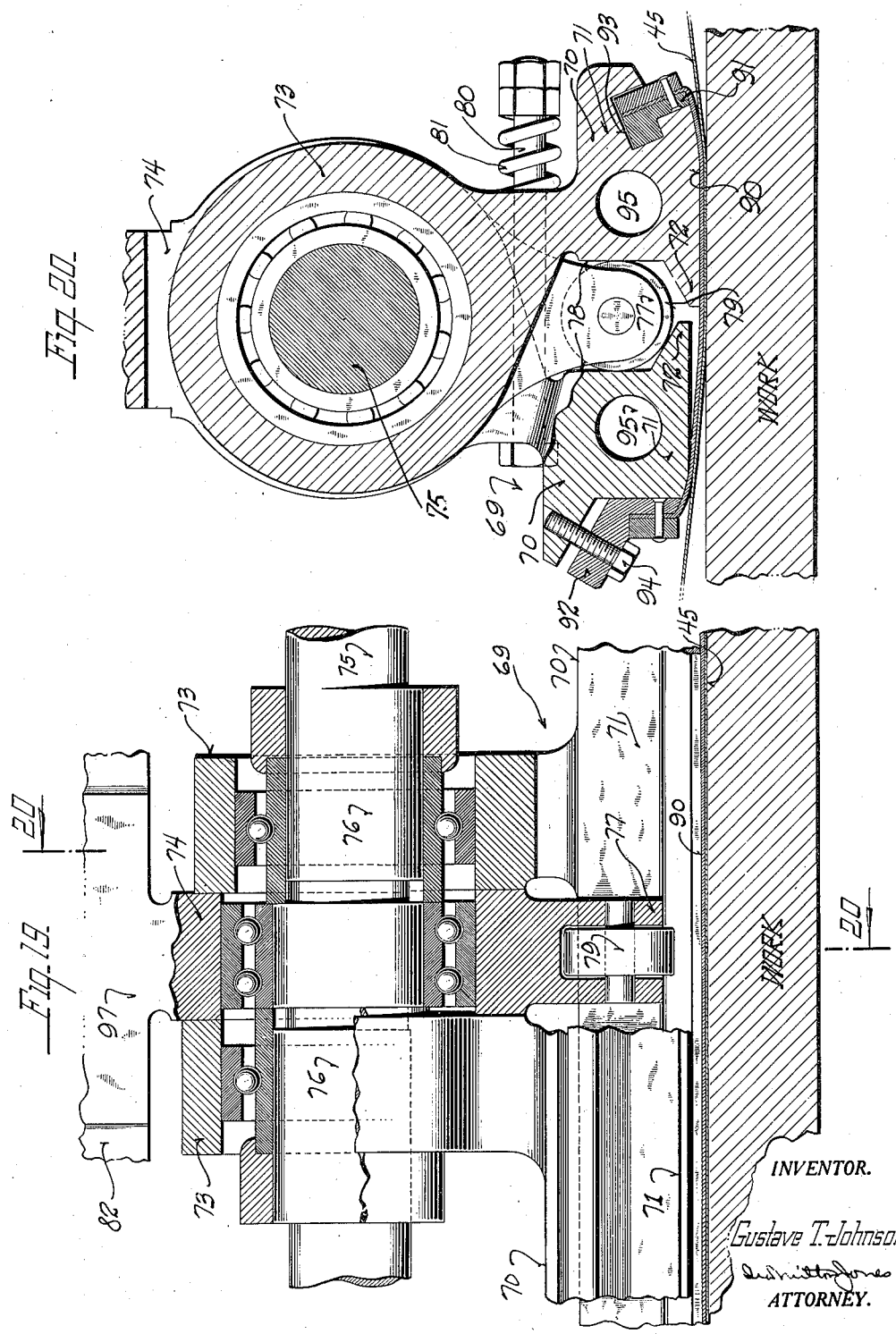

Dec. 15, 1936.　　　　G. T. JOHNSON　　　　2,064,476
ABRADING MACHINE
Filed July 25, 1931　　　　15 Sheets-Sheet 15
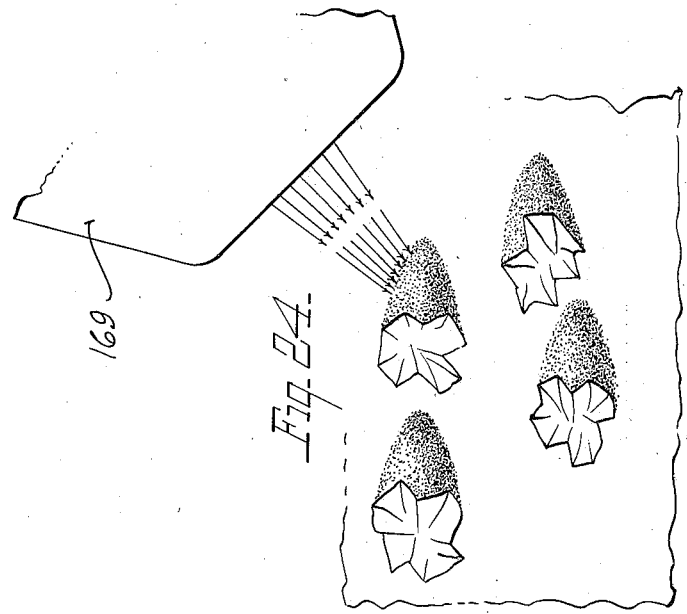
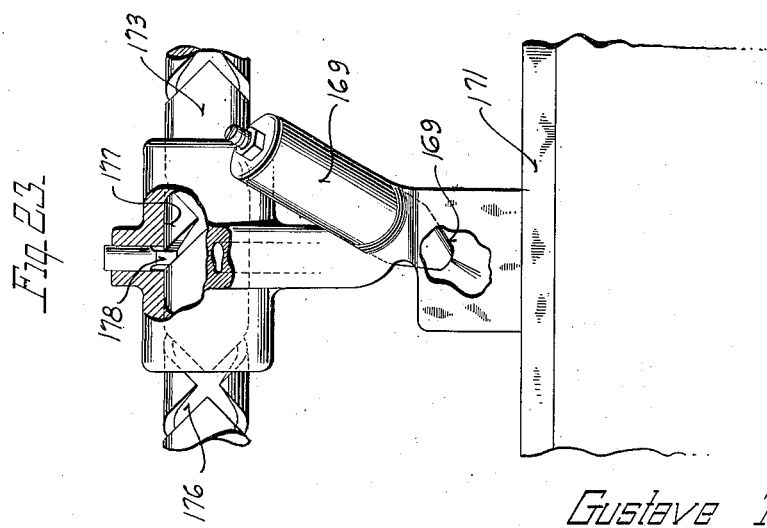
INVENTOR.
Gustave T. Johnson.
BY
ATTORNEY.

Patented Dec. 15, 1936

2,064,476

UNITED STATES PATENT OFFICE 2,064,476

ABRADING MACHINE

Gustave T. Johnson, Sheboygan Falls, Wis.

Application July 25, 1931, Serial No. 553,090

37 Claims. (Cl. 51—140)

This invention relates to certain new and useful improvements in abrading machines, and while it refers particularly to automatic sanding machines for use in the wood working art, it is equally applicable to abrading machines for use in certain metal working industries.

The abrading machines, and particularly the automatic sanders, heretofore in use, were made in two general types, the roll or cylinder type and the endless belt type. Belt sanders were used practically only for special irregularly shaped work, whereas the roll or cylinder sanders were designed primarily for flat stock, and like the conventional roll sander, the abrading machine of this invention is intended for use with flat work.

Roll sanders have proven objectionable in several respects, but the principal objection to this type of sanding machine is the necessity for a comparatively slow rate of work feed. The reason for this slow feed is that the abrading cylinders or rolls have little more than a line contact with the work passing therebeneath. Theoretically this contact is but a very narrow line extending across the work at the point of tangency of the abrading cylinder with the work, but by reason of the inherent resiliency of the felt or other material with which the roll is covered beneath the abrading material, the area of contact between the abrading cylinder and the work is increased to a strip approximately one-half inch wide. However, even this degree of contact between the abrasive element and the work is small and therefore to obtain satisfactory results it is necessary to maintain the rate of feed at less than twenty feet per minute.

Another reason for the slow rate of work feed in the conventional roll sanders is the fact that at high speeds, vibration marks are very plainly visible in the finished work.

With the above and other objections to existing abrading machines in mind, this invention has as a general object to improve the construction of abrading machines and to provide an abrading machine in which the rate of work feed may be greatly increased.

In this respect it is desired to point out that the machine of this invention enables the rate of work feed to be increased from approximately twenty feet per minute to between sixty and one hundred feet per minute.

Another object of this invention is to provide an abrading machine so designed and constructed that protruding particles of abrasive cannot produce objectionable long scratches in the surface of the work.

Another object of this invention is to provide novel means for using an endless abrasive belt.

Another object of this invention is to provide an abrading machine in which a rapidly moving substantially flexible abrasive element is automatically intermittently engaged with the work as it is passed through the machine.

Another object of this invention resides in the provision of a vibratory pressure shoe extending across the width of an abrasive belt to intermittently engage the abrasive belt with work passed therebeneath.

Another object of this invention is to provide an abrading machine having a plurality of spaced drums over which an abrasive belt moves and means for engaging the abrasive belt with the work passed through the machine independently of the drums so as to preclude the possibility of vibration marks, due to any slight unbalance in the drums, from showing on the finished work.

Another object of this invention resides in the provision of novel means for adjusting the tension of the abrasive belt so as to accommodate any variation in the length of the belt at its opposite edges.

Another object of this invention resides in the provision of independent means for maintaining a constant tension at both edges of the belt to compensate for any variation in the length of the belt at its opposite edges after it has been adjusted.

Another object of this invention resides in the provision of means for adjusting one of the rolls over which the belt is trained to insure proper tracking of the belt and offset any tendency for it to climb the high side of the adjustable roll.

Another object of this invention resides in the provision of novel means for cleaning the abrasive surface.

Another object of this invention resides in the provision of novel means for cleaning the work and the travelling work support or bed.

And a further object of this invention resides in the provision of novel means for mounting the abrasive units as a whole from the machine proper so as to facilitate removal and replacement of the abrasive belt.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, one complete example of the physical embodiment of this invention is illustrated constructed according to the best mode so far devised for the practical application, of the principles thereof, and in which:

Figure 1 is an elevation view of the left side of an abrading machine constructed in accordance with this invention;

Figure 2 is an elevation view of the opposite side of the machine;

Figure 3 is an elevation view of the front end of the machine;

Figure 4 is an elevation view of the back end of the machine;

Figure 5 is a longitudinal section view taken through Figure 3 on the plane of the line 5—5;

Figure 6 is a cross section view taken through Figure 5 on the plane of the line 6—6;

Figure 7 is a detail view illustrating the drive connections for the travelling work support or bed and the cleaning brushes, said view being taken substantially on the plane of the line 7—7 of Figure 1;

Figure 8 is a detail view illustrating part of the drive for the travelling work support bed and said view being taken substantially on the plane of the line 8—8 of Figure 4;

Figure 9 is a top view of the structure shown in Figure 8 taken on the plane of the line 9—9;

Figure 10 is a cross section view similar to Figure 6, but enlarged to show the details of the pressure shoe and the manner of moving one of the rolls to adjust the tension on the abrasive belt;

Figure 11 is a view partially in top plan and partially in section taken through Figure 10 on the plane of the line 11—11;

Figure 12 is a detail section view taken through Figure 10 on the plane of the line 12—12;

Figure 13 is a fragmentary section view taken through Figure 14 on the plane of the line 13—13;

Figure 14 is a detail section view taken through Figure 10 on the plane of the line 14—14;

Figure 15 is a fragmentary section view taken through Figure 14 on the plane of the line 15—15;

Figure 16 is a detail section view taken through Figure 10 on the plane of the line 16—16;

Figure 17 is a detail section view taken through Figure 16 on the plane of the line 17—17;

Figure 18 is a fragmentary view illustrating the manner of rendering the manual control for the work bed adjustment inoperative, said view being taken on the plane of the line 18—18 of Figure 3;

Figure 19 is an enlarged detail view of part of the vibratory pressure applying element with parts thereof broken away to more clearly illustrate structural details;

Figure 20 is a cross section view taken through Figure 19 on the plane of the line 20—20;

Figure 21 is a cross section detail view illustrating the air nozzle for cleaning the abrasive element, said view being taken on the plane of the line 21—21 of Figure 3;

Figure 22 is a detail section view taken through Figure 21 on the plane of the line 22—22;

Figure 23 is a fragmentary detail view illustrating the manner of mounting the air nozzle, said view being taken on the plane of the line 23—23 of Figure 21; and Figure 24 is a view illustrating a portion of an abrasive surface greatly magnified, and the manner in which the air stream cleans the particles of the abrasive material thereon.

Referring now more particularly to the accompanying drawings, in which like reference characters designate like parts, it is seen that the abrading machine in general consists of a traveling endless work support or bed A adjustable vertically in a stationary frame or base indicated generally by the letter B. Carried by the stationary supporting structure B is one or more abrading units C, two in the present instance, arranged for abrasive action upon work carried through the machine by the traveling bed A.

The general arrangement of the machine thus conforms with accepted practice and is similar to the arrangement of the conventional drum sanding machines in which a plurality of cylinders or drums are rotatable above a traveling work support. The abrading units C of this invention, however, differ greatly from the conventional abrasive covered rolls or cylinders and obtain not only greatly improved results, but also facilitate an appreciable increase in the speed at which the work may be fed through the machine, as will be hereinafter more fully described.

*Traveling work support "A" and supporting base "B"*

It is observed from the drawings that the supporting structure B comprises a substantially rectangular base 1, from the opposite sides of which side members 2 and 3 extend. The side member 2 is relatively narrow in comparison with the side member 3, and is at the left side of the machine when viewed from the front or infeed end of the machine, which is the right hand end in Figure 1.

The traveling work support or bed A consists of a frame having side plates 4' connected by a series of cross rails 5. At the front and back ends of the side plates 4 are transversely extending shafts 6 and 7, respectively. The shafts 6 and 7 each have secured thereto a pair of sprocket wheels 8 over which endless chains 9 are trained. The chains 9 are connected by a plurality of transversely extending slats 10 which rest on longitudinally extending tracks 11 mounted across the transverse rails 5 along the upper stretch of the chains so that the transverse slats 10 receive rigid support.

The outer surface of the transverse slats 10 have rubber pads 12 fixed thereto to frictionally engage work supported thereon and carry the same through the machine, the chains 9 carrying the slats being driven from the sprocket wheels fixed to the shafts 6 and 7 in a manner to be later described. The shaft 6, which is located at the front or infeed end of the machine, is journaled in bearings 13 slidably mounted in the adjacent portions of the side plates 4 to afford adjustment of the tension of the chains in the conventional manner.

The entire work support A is adjustable vertically to accommodate work of different thicknesses, by means of a pair of wedges 14 which are slidably mounted on tracks 15 formed on the bottom of the base, and have their upper inclined edges 16 slidably engaged with the correspondingly inclined bottom edges 17 of the side plates 4.

An interengaging slide structure consisting of vertically disposed guide ways 18 fixed to the side member 3 and a vertically disposed guide 19 fixed to the adjacent side plate 4 holds the frame of the work support A against horizontal movement, but permits free vertical movement thereof, so that as the wedge 14 is moved longitudinally, the work support A is carried up or down as will be readily apparent.

Adjustment of the wedges 14 is effected simultaneously by screws 20 threaded in nuts 21 carried by the wedges and provided at their outer ends with worm wheels 22. The outer ends of both screws are journaled in suitable bearings 23 at the front end of the base and both worm wheels are adapted to be driven simultaneously by worms 24 fixed to a common transverse shaft 25. The shaft 25 is directly connected with the rotor of a reversible electric motor 26 mounted in the base so that the retraction or projection of the wedges 14 may be accomplished upon operation of the motor 26.

A hand wheel 27 is also provided to facilitate manual adjustment of the wedges and this wheel is fixed to a shaft which extends longitudinally into the machine from the front end of the base to be drivingly connected with the shaft 25 through bevel gears 28 and 29. The bevel gear 28 is fixed to the shaft of the hand wheel and, as brought out in detail in Figure 18, longitudinal retraction of the hand wheel shaft disengages the bevel gears 28 and 29. A yieldably urged ball 30 is engageable in either of a pair of depressions formed in the shaft to hold the hand wheel shaft either in its position engaging the gears or in a retracted position at which the gears are disconnected.

Drive for traveling work support

The drive for the traveling work support is obtained from an electric motor 31 mounted on the base at the right side of the machine and adjacent the back end. As best illustrated in Figure 7, the motor shaft 32 is extended to substantially the center of the machine where a drive pinion 33 is secured thereto. This pinion meshes with a gear 34 fixed to a shaft 35 journaled in bearings 36 carried by the base.

The outer ends of the shaft 35 which extends substantially across the width of the machine, have bevel gears 37 fixed thereto which are disposed within gear boxes 38 connected with the bearings 36. The bevel gears 37 are meshed with bevel gears 39 also mounted within the gear boxes 38 and held against longitudinal movement with respect to shafts 40, with which they have a slidably splined connection, as clearly illustrated in Figure 8.

The vertical shafts 40 are journaled at their lower ends in bearings 41 forming part of the gear box structures 38 and extend upwardly to be drivingly connected with worms 42 journaled in gear boxes 43 fixed to the adjacent portions of the work support side plates 4. The side plates 4 forming part of the traveling work support A are movable vertically, as hereinbefore brought out, but inasmuch as the shafts 40 have a slidably splined driving connection with the bevel gears 29 such vertical adjustment does not disturb the drive to the worms 42.

Also mounted within the gear boxes 43 are worm wheels 44 fixed to the opposite end portions of the shaft 7 so that a positive drive connection is at all times maintained from the motor 31 to the shaft 7 which drives the movable work support.

It is observed that the point of application of the driving force to the driven elements is at the center of the machine so that any possibility of one side of the traveling work support lagging behind the other due to twisting of the driving shaft, is entirely obviated and thus both edges of the traveling work support are driven in strict correspondence.

The abrading units

Each abrading unit C consists of an abrasive belt 45 trained over sets of rolls 46, 47, and 48, and as the abrading units are identical except that the abrasive belt 45 of the first unit has a relatively coarse abrasive surface and travels opposite the direction of the work fed through the machine, whereas the abrasive belt of the following unit has a relatively fine abrasive surface and travels with the direction of work movement.

Obviously the number of abrading units employed does not in any way change the spirit of the invention, and inasmuch as the abrading units are similar in construction, a description of one will suffice for both.

As stated, each abrading unit consists of a plurality of spaced rolls about which an abrasive belt is trained. The rolls 46 and 47 are mounted with their lower peripheral surfaces in substantially a common horizontal plane and the roll 48 is mounted substantially above the roll 47. The roll 46 has a rubber or other suitable highly frictional covering 49 and is driven directly from an electric motor 50 built into the upper portion of the side member 3.

The rolls 47 and 48 are idlers with the roll 48 mounted for movement toward and away from the roll 47 to adjust the tension of the belt and facilitate removal and replacement of the belt on the rolls. Inasmuch as the belt is endless it can only be removed from and positioned on the rollers by moving the same longitudinally over one end of the rolls, and hence the mounting for the rolls is effected entirely from the side member 3, as will be hereinafter more fully described. Detachable means at the the opposite ends of the rolls adjacent the side member 2 hold the unit in proper position during operation of the machine.

As brought out in detail in Figure 13, the end of the drive roll 46 adjacent the side member 3 is journaled in a bearing 51 carried by the side member 3 and as the rotor of the motor 50 is mounted on the end of the shaft 52 which carries the roll 46, the bearing 51 serves as part of the motor structure. The shaft 53 of the idler roll 47 has its end adjacent the side member 3 journaled in a bearing 54 in the adjacent portion of the side member.

The ends of the shafts 52 and 53 of the rolls 46 and 47, respectively, adjacent the side member 2 are suitably journaled in bearings 55 and 56, respectively, carried by an end plate 57 which is rigidly connected with and supported from the side member 3 by a transverse beam 57'.

The shaft 58 of the upper idler roll 48 has its ends journaled in bearings 59 and 60 vertically adjustably carried by the side member 3 and the end plate 57, respectively. The specific manner of adjustably mounting the bearings 59 and 60 and the manner of adjusting the bearings will be more fully described hereinafter, but it is noted at this point, that the vertical adjustment of the upper idler roll permits the roll to be lowered so as to facilitate engagement and removal of the abrasive belt from the rolls and also enables the tension of the belt to be adjusted.

As hereinbefore stated, the supporting structure of the abrading unit is primarily carried by and supported from the side member 3, but means are also provided for rigidly supporting the outer free end of the abrading unit frame which means is indicated generally by the numeral 61. This supporting means 61 consists of a latch 62 pivotally mounted between the arms of a yoke 63 secured to the adjacent upper portion of the side member 2.

The outer free end of the latch 62 has its end and side walls tapered inwardly to engage the correspondingly tapered walls of a recess 64 formed in a block 65 bolted or otherwise secured to the adjacent outer side of the end plate 57. A bolt 66 hingedly mounted at its inner end, has its threaded outer end projected through suitable openings in the end plate 57 and the block 65 to project through a slot 67 in the outer end of the lever and a nut 68 threaded on the bolt serves to draw the end of the lever down into the recess 64 and thus rigidly ties the free end portion of the abrading unit frame to the side member 2.

It is observed that the block 65 is vertically adjustable on the end plate 57 so as to enable the abrading unit frame to be accurately adjusted into parallelism with the work support.

As will be readily apparent when it is desired to remove the abrasive belt the latch 62, is swung to inactive position and the top roll 48 is lowered sufficiently to loosen the belt when outward withdrawal of the belt will be readily possible.

Pressure applying shoes

As already stated, this invention provides an area of contact between the abrasive surface and the work approximately three times that obtainable with the conventional roll sander, which enables the work to be fed through the machine at a greatly increased speed. This larger contact between the abrasive element and the work is made possible by a pressure applying element indicated generally by the numeral 69. This pressure applying element is mounted between the rolls 46 and 47 and extends across the width of the abrasive belt. It engages the inner surface of the abrasive belt and projects beyond the plane tangent to the lower peripheries of the rolls 46 and 47 to hold the abrasive belt therebeyond so that at no time do the rolls 46 and 47 contact with the work.

In detail, the pressure applying element comprises two side by side pressure shoes 70 mounted for simultaneous and opposite vertical reciprocation to hold the abrasive belt against the work alternately at spaced areas for relatively short periods of time. Each pressure shoe comprises an elongated bar 71 having a flat bottom surface and the adjacent sides of the shoes are extended toward each other, as at 72, to position their bottom surfaces closely together.

Projected upwardly from the elongated bar portions 71 are bearings 73, each shoe having three such bearings and the adjacent bearings of the two shoes being disposed one on each side of supporting bearings 74. Extended through the aligned bearings 73 and 74 is a revoluble shaft 75 which is in axial alignment with the axis of the supporting bearings 74, and has diametrically opposite eccentrically offset portions 76 at each side of the supporting bearings 74, which offset portions are journaled in the bearings 73 of the pressure shoes.

Inasmuch as the eccentrically offset portions 76 are diametrically opposite and as the bearings 73 of each shoe are journaled on one set of eccentric portions, it follows that upon revolution of the shaft 75 the pressure shoes will be reciprocated simultaneously in opposite directions, and to hold the pressure shoes against rotation about the axis of the shaft and insure the reciprocation being in a vertical direction, the supporting bearings 74 have downward extensions 77 disposed between the adjacent sides 78 of the pressure shoes. Rollers 79 carried by the downward extensions 77 provide anti-friction means with which the pressure shoe side walls 78 engage and to hold the pressure shoes in engagement with the rolls, the pressure shoes are tied together under tension by cross bolts 80 and expansive springs 81 coiled about the bolts.

The pressure shoes are carried by a transverse member 82 from the bottom of which the bearings 74 project; and the transverse member 82 is vertically adjustably supported by means indicated generally by the numeral 83, from the cross beam 57' which is substantially inverted channel shaped in cross section and has the transverse member 82 received between its side walls.

The adjustable support for the beam 82 enables the pressure applying shoes to be moved vertically toward and away from the work support, and inasmuch as the adjustment of the distance between the work support and the pressure applying shoes, which is controlled by the thickness of the stock or work to be acted upon, is roughly adjusted by means of the wedges beneath the work support, the vertical adjustment of the pressure applying shoes provides a very fine adjustment for the pressure exerted on the work through the abrasive element. The details of the adjustable support and the manner of effecting adjustment thereof will be hereinafter more fully described.

The shaft 75 which, affords the direct support for the pressure shoes and also reciprocates the same vertically upon revolution of the shaft, has its end adjacent the side member 3 extended and journaled in a bearing 84 carried by an extended end 85 of the transverse beam 82, with its extreme end portion projected into a cavity 86 in the adjacent portion of the side member 3 to mount a gear 87. The gear 87 is drivingly connected with the motor shaft 52 through an idler gear 88 and a pinion 88' fixed to the shaft 52, see Figure 14.

The idler gear 88 is journaled on a stud 89 fixed in the adjacent portion of the side member 3 and is positioned with its axis in a plane substantially bi-secting the range of vertical adjustment of the shaft 75 with the pressure applying shoes, but inasmuch as the overall vertical adjustment of the shoes is relatively small, the relative movement between the gears 87 and 88 does not disturb their proper driving connection. The shaft 75 is driven at a relatively high rate of speed so that the pressure shoes are vibrated at a correspondingly high rate of speed, which under normal conditions is approximately 1000 times per minute, and the abrasive belt travels at approximately 4000 feet per minute.

The vibration or vertical reciprocation of the pressure shoes, although it is comparatively slight, being but twenty thousandths of an inch, not only makes a comparatively wide flat engagement between the abrasive belt and the work possible, but also precludes scratching or marring of the work by unusually coarse or high particles of abrasive material on the belt.

The manner in which the vibration or vertical reciprocation of the pressure shoes precludes scratching of the work is best understood from the following example.

Assuming that the pressure applying element were stationary and maintained the abrasive element or belt in constant engagement with the work surface, a high or exceptionally coarse particle of abrasive material on the belt would cut a deep groove into the work throughout its entire length inasmuch as the belt travels at a speed of 4000 feet per minute. This condition obviously also existed in the conventional drum type sander and while attempts were made in the drum type machine to overcome this objection, by reciprocating the drum axially, this resulted only in producing a "snaky" or wavy groove.

With the structure of the instant invention, it is practically impossible for a single high grain of abrasive material to cut a groove longer than the width of the flat bottom of one of the pressure shoes, for assuming that one of the shoes is in its lowest position holding the belt to the work with maximum pressure and that the portion of the abrasive belt passing beneath this shoe at this particular time has a high grain of abrasive, the scratch produced in the work would be only as long as the width of the flat bottom surface of the shoe or approximately three-fourths of an inch.

By the time this same grain of abrasive returns to a position beneath either of the shoes it is highly probable that at that particular time neither shoe is in its pressure applying position. Obviously then the high grain of abrasive passes under the pressure applying shoes without marring the surface of the work.

It is also obvious that the pressure shoes are continuously pressing down different portions of the belt and with the elements in the particular proportion shown and traveling at the rates of speed indicated, the probability of the pressure occurring at the same point is but one to ninety-six times or once every fifteen seconds. Hence, if work were carried through the machine at a minimum speed of 20 feet per minute it would mean that a single high grain of abrasive would scratch the work every five feet, and as the work sanded is rarely longer than five feet, it is possible that this particular high grain of abrasive would form but a single short and unnoticeable scratch in the work.

It is of course understood that many high grains of abrasive may exist across the width of the belt, but it is also obvious that the intermittent application of pressure on the abrasive belt precludes the formation of continued grooves by these high grains of abrasive.

To prevent excessive wear on the back or rear surface of the abrasive belt as it passes under the pressure shoes, the bottom surfaces of the shoes are covered by a felt pad 90. Any suitable manner of attaching the pad may be employed, but it has been found desirable to secure metal strips 91 and 92 to the edges of the pad, which is wide enough to extend across the width of both pressure shoes. The strip 91 is detachably received in a groove 93 in one shoe and the strip 92 may be adjustably secured to the other shoe by means of screws 94 or the like.

It is also desirable to cool the pressure shoes and to this end they are provided with cored openings 95 extending throughout their lengths, and through which water or other suitable cooling medium may be circulated in any suitable manner.

The adjustment of the pressure shoes

As hereinbefore stated, the transverse member 82 which carries the pressure shoes, is vertically adjustably supported from the cross beam 57' by adjustable means 83.

This adjustable supporting means 83 is best illustrated in Figure 16 and comprises two threaded studs 96 fixed to the tops of guide pads or enlargement 97 formed on the transverse member 82 at equal distances from the center of the machine, by cap screws 98 or the like passed through openings in flanges 99 at the lower end of the studs. The enlargements or pads 97 are of a width to have their side faces slidably received between finished pads 100 formed on the inner walls of the channel shaped beam 57' so that the transverse member 82 is held against sidewise movement by the beam.

The threaded studs 96 extend upwardly into chambers 101 formed integral with the beam 57' and providing gear housings. Also rotatably journaled within the chambers or gear housings 101 and in axial alignment with the threaded studs 96 are worm wheels 102 having internally threaded bores to receive the studs 96, and as the worm wheels are held against axial movement by thrust bearings 103 and 104 at the bottom and top of the gear housings, respectively, it follows that rotation of the worm wheels imparts vertical movement to the threaded studs 96 to carry the pressure applying structure up and down.

Inasmuch as it is necessary that the pressure applying element maintain a parallel relationship with the work support at all times it is necessary that both worm wheels be driven in correspondence and to this end, a single shaft 105 carries two worms 106, each meshing with one of the worm wheels. The shaft is journaled in bearings formed as part of the gear housings 101 and one end thereof extends through the end plate 57 to mount a hand wheel 107 by which the shaft may be actuated to effect adjustment of the pressure applying means.

It is desirable that the adjustment of the pressure shoes be extremely accurate. In fact this adjustment may be considered of a micrometer nature, and to insure this extreme accuracy, means are provided for taking up any possible play in the adjusting mechanism. The points of possible play are obviously at the threaded engagement of the studs 96 with their respective worm wheels and in the threaded engagement of the worms with the worm wheels.

Any play between the two worms and the worm wheels is entirely eliminated by forming the worm wheels in two cooperating sections adjustably connected on a plane extending transversely through the wheels and at right angles to their axes.

Each worm wheel thus consists of a lower section 108 and an upper section 109 and a central boss 110 projecting upwardly from the lower section 108 is received in a central bore 111 formed in the upper section to maintain the worm wheel sections in proper axial alignment. The sections are held together in any desired position of circumferential adjustment with respect to each other by cap screws 112 passed through elongated openings 113 in one section and threaded into suitable openings in the other section. It is thus possible to shift the worm wheel sections circumferentially with respect to each other to align or disalign their teeth as clearly illustrated in Figure 17 and thereby take up any back lash or play existing between the worm wheel and worm.

Play between the threads of the studs 96 and the internally threaded bores of the worm wheels is taken up by expansive springs 114. Each spring 114 encircles the upper end portion of one stud within the central bore 111 of the upper worm wheel section and is confined between the top of the central boss 110 of the lower worm wheel sections and a nut 115 threaded on the extreme upper end of the stud and held against accidental rotation by a set screw 116 threaded on the adjacent portion of the upper worm wheel section. The springs 114, being at all times in compression thus tend to pull the studs upwardly through the threaded bores of the worm wheels and thereby take up any play existing between the respective threads of the studs and the worm wheel bores.

*Adjustment of top roll*

The bearings 59 and 60 in which the ends of the shaft 58 of the top roll 48 are journaled are carried respectively by slides 117 and 118 vertically slidably mounted in guide ways formed in the side member 3 and the end plate 57 respectively. Extended inwardly from the slides 117 and 118 are spaced lugs 119 which have axially aligned bores 120 in which adjusting screws 121 are loosely received, and nuts 122 engaging the top of the lowermost lugs 119 of the slides and non-rotatably connected therewith, have threaded engagement with the screws 121.

Expansive springs 123 encircling the screws and confined between the nuts and the uppermost lugs 119 yieldably maintain the nuts in engagement with the lower lugs 119. This structure thus provides, in effect, a threaded connection between the adjusting screws 121 and the slides with the added feature of having the slides yieldable for movement in one direction with respect to the screws for a purpose to be later described.

The lower ends of the screws 121 are journaled in bearings 124 and 125 carried by the side member 3 and the end plate 57, respectively, and have bevel gears 126 and 127 fixed thereto. Thrust bearings 128 are disposed between the hubs of the bevel gears 126 and 127 and their respective bearings 124 and 125 and collars or enlargements 129 are formed on the screw shafts above the bevel gears so that the screw shafts are held against downward axial movement.

Upward axial movement of the screws is obviously opposed by the weight of the roll 48 and the tension of the abrasive belt when the same is in position.

As the screws 121 are thus held against axial movement, it is apparent that rotation thereof carries the slides 117 and 118 and consequently the roll 48 upwardly and downwardly depending upon the direction of rotation.

Rotation is imparted to the screws by means of bevel gears 130 and 131 meshing with the bevel gears 126 and 127, respectively. The gears 130 and 131 are fixed to the outer ends of shafts 132 and 133 respectively. The inner ends of the shafts 132 and 133 extend into a gear housing 134 carried by the central portion of the transverse beam 57' and have a driving connection with an actuating shaft 135 also extended into the gear housing, through differential gearing indicated generally by the numeral 136. The shaft 135 extends through a suitable bearing in the end plate 57 to mount a hand wheel 137 by which the adjusting mechanism may be manually actuated.

The differential gearing 137 through which the action of the shaft 135 is imparted to the screws, enables the roll 48 to adjust itself to any variation in the length of the abrasive belt at its opposite edges as it permits the shafts 132 and 133 to operate independently of each other and raise and lower their respective slides higher or lower with respect to each other to accommodate any variation in the length of the belt at its opposite edges.

The differential gearing may be of any desired specific construction and in the present instance consists of bevel gears 138 and 139 fixed to the ends of the shafts 132 and 133 respectively, and arranged with floating pinions 140 carried by a ring gear 141. The ring gear 141 has external teeth adapted to mesh with a driving pinion 142 on the inner end of the shaft 135.

The differential gearing may be rendered inoperative when it is desired to maintain the roll 48 against tilting, and to this end the bevel gear 139 has a spur gear 143 fixed thereto which is of the same diameter as the ring gear 141. The drive pinion 142 is of a width sufficient to engage not only the teeth of the ring gear 141, but also the teeth of the gear 143 upon longitudinal shifting of the shaft 135 which carries the drive pinion, outwardly to a position illustrated in Figure 11.

When the drive pinion 142 is thus in mesh with both the ring gear and the gear 143 it is apparent that the shafts 132 and 133 are rigidly connected so that both screws move in unison. Upon inward longitudinal shifting of the shaft 135, the drive pinion 142 may be disengaged from the gear 143 to thus enable the differential gearings to function in the normal manner.

With the abrasive belt in position over the rolls, actuation of the adjusting means to tighten the belt places the expansive springs 123 under a degree of compression so that in the event the belt stretches after the adjustment has been made the springs retain the desired degree of tension on the belt, and as the springs are free to operate independent of each other lengthening of the belt at its opposite edges due possibly to uneven heating, is compensated for by the action of the springs.

As hereinbefore brought out, the belt is apt to be greater in length at one side edge than at the other, and consequently the roll 48, to maintain a uniform tension on the belt, has one end raised above the other. This position of the upper roll would tend to cause the belt to track improperly due to its tendency to climb the high side of the roll. To offset this undesirable condition, the end of the roll 48 adjacent the end plate 57 is mounted for sidewise shifting.

The structure by which the sidewise shifting of this end of the roll is made possible comprises a transversely extending head 144 on the slide 118, the top surface of which is provided with a groove 145 in which a guide 146 extended from the bottom of the bearing 60 is slidably received. The head 144 and consequently the plane of movement of the bearing 60 thereon, is slightly inclined from the horizontal.

Carried by the bottom of the bearing guide 146 is a rack 147 which has its teeth formed on its bottom face to mesh with a pinion 148 fixed to a stud shaft 149 journaled in the slide 118. Rotation of the pinion 148 thus moves the guide along the inclined plane of the head 144 to carry the adjacent end of the roll 48 to one side or the other of a vertical plane passing through the center of the bearing 59 and parallel with the axes of the rolls 46 and 47 so that sidewise substantially horizontal adjustment of one end of the roll 48 may be effected to offset a tendency for the belt to climb the high side of the roll to insure proper belt trackage. The rotation of the pinuion 148 to effect this sidewise adjustment is obtained by a lever 150 fixed to the outer end of the stud shaft 149, and conveniently located on the face of the end plate 57.

It is observed that the top idler roll is formed of three independent sections. This reduces the friction between the surface of the roll and the abrasive belt in the event that one edge of the belt is longer than the other and slippage is necessitated between the surface of the roll and the abrasive belt, for by forming the roll in independent sections the degree of friction incidental to the slippage is reduced in that the outer rolls are free to travel at different speeds.

*Cleaning brushes for work and work support*

At the back end of the machine the work and also the traveling work support bed is brushed. The work is cleaned by a rotatable brush 151 mounted in a suitable chamber 152 formed in a casting 153 which extends across the width of the machine and is fixed to the side members 2 and 3 to assist the transverse rails 5 to tie the structure together. The casting 153 has its inner wall curved to lie parallel with the adjacent cylindrical surface of the drive roll of the adjacent abrading unit, and serves as part of an enclosure therefor, as will be hereinafter more fully described.

The ends of the brush chamber 152 are closed and bearings are formed in the closed end walls to rotatably mount the shaft 154 of the brush. One end of the shaft 154 is extended beyond the adjacent side of the casting 153 to mount a bevel gear 155 and this gear meshes with a bevel gear 156 fixed to the upper end of the adjacent worm 42. The brush 151 is thus driven directly from the drive for the traveling bed or work support.

Cleaning of the work engaging surfaces of the traveling bed is effected by a second brush 157 similar to brush 151, but mounted in a different manner. This brush 157 is carried by a guard housing 158 substantially U shaped in cross section with the brush bristles projecting beyond the plane of the open side of the housing. The closed end walls of the housing have suitable bearings to revolubly mount the shaft 159 of the brush and the entire housing 158 with the brush assembled therein is supported by arms 160 and 161 connected with the end walls of the housing 158 and pivotally mounted for swinging movement about the axis of the shaft 7.

The arm 161 is in the form of a guard housing for a sprocket chain 162 in mesh with sprockets 163 and 164 fixed respectively to the shaft 7 and the brush shaft 159 so that the brush is driven directly from the shaft 7. The arms 160 and 161 are of such length that the exposed brush bristles sweep the work engaging surface of the traveling bed as it passes the brush in its lower return stretch.

It is noted that the traveling bed hangs at a downwardly inclined angle at its point of contact with the brush and this fact facilitates the adjustment of the brush to insure maximum efficiency and compensate for wear on the brush, for movement of the brush toward the machine effects a closer engagement with the surface being cleaned and movement of the brush away from the machine carries the brush away from the surface to be cleaned.

It is, therefore, only necessary to swing the arms 160 and 161 about their pivotal mounting to adjust the brush with respect to the traveling bed, and to hold the brush secured in its desired position of adjustment, the arms 160 and 161 are provided with enlarged flanges 165 which lie flat against the covers 166 of the gear casings in which the worm wheels 44 are mounted and to which they are adjustably secured by cap screws 167 passed through elongated arcuate slots 168 in the flanges 165.

*Removal of material from abrasive belt*

It is well known that an abrasive substance such as sand paper and the like loses its effectiveness rapidly when its abrasive surface becomes packed with the material removed from the work, and where the amount of material removed is excessive as in the present case, it is desirable to provide means for cleaning the packed material from the abrasive surface.

Heretofore, various methods of cleaning an abrasive surface have been attempted. The present invention provides means for removing the material from the abrasive surface before it has a chance to pack and to this end an air nozzle 169 is supplied for each abrading unit. This nozzle receives air under pressure from a suitable source (not shown) through a flexible tube 170, as best illustrated in Figure 21. It has an adjustable needle valve 172 which causes the stream of air projected therefrom to converge and the nozzle is so mounted with respect to the abrasive surface that the air stream strikes the surface at or near the point of convergence so that a needle-like blast of air is directed against the abrasive surface.

The nozzle is mounted to travel back and forth across the width of the belt by a casting 171, which like the casting 153, extends across the width of the machine and is carried by the side members 2 and 3 and also has its inner wall concentric to the adjacent roll 46 to form part of an enclosure for the rolls, to be later described.

Movement of the nozzle back and forth across the width of the belt is effected by means of a shaft 173 journaled in bearings 174 and 175 and which shaft has a crossed thread 176 formed therein. The shaft is slidably received in a bore 177 formed in an extension carried by the nozzle and a cam 178 carried by the extension engages with the crossed threads to cause the nozzle to move back and forth as the shaft is revolved.

The shaft 173 may be driven in any suitable manner and in the present instance is provided with a pulley 179 which is drivingly connected through a belt 180 with a pulley 181 fixed to the shaft of the adjacent motor 50.

The nozzle, as shown in the drawings, is positioned at an angle to direct the blast of air against the abrasive surface so that it strikes the same from the side with reference to the direction of movement of the abrasive belt. This position of the nozzle utilizes the force of the air in the most efficient manner for, as is brought out diagrammatically in Figure 24, the stream strikes the side of the bank of dust or removed material.

*Abrading unit enclosures*

Cooperating with the transverse castings 153 and 171 hereinbefore mentioned, is a center casting 182 which likewise extends across the width of the machine and is carried by the side members 2 and 3. The opposite sides of this center casting are concentric to and spaced from the cylindrical surfaces of the rolls 47, and the bottom thereof is on the same plane as the bottom of the castings 153 and 171.

It is observed that the castings 153 and 171 have extension plates 183 projecting inwardly therefrom, the inner edges of which are spaced from the adjacent edges of the center casting a distance to permit the projection of the abrasive belts beneath the plane of the casting bottoms and into engagement with the work passing therebeneath. The bottoms of the abrading units are thus substantially enclosed.

The upper portion of each abrading unit is closed by a guard covering 184 whose edges rest on and are secured to the end and center castings and as clearly shown, these coverings 184 complete the enclosure around the top and sides of the abrading unit and provide protection against breakage of the belt. The ends of the units are substantially closed at one end by the side member 3 and at the other end by the end plate members 57.

At the point of connection between the housings 184 and the end castings 153 and 171 exhaust chambers 185 are provided. These chambers are preferably formed of sheet metal and communicate with the interior of the abrading unit enclosures and the chamber adjacent the back end of the machine also communicates with the brush chamber 152. Exhaust trunks 186 lead from the exhaust chambers to carry off the material as it is removed from the work and from the abrasive belt.

The side walls of the exhaust housings 185 have slots 187 extending across their length to accommodate the nozzle structure and permit the same to move back and forth within the exhaust housing.

Operation

To operate the abrading machine of this invention the height of the bed plate A is first adjusted to accommodate the thickness of the stock to be acted upon. If the necessary elevation or lowering of the bed plate is a substantial distance, the motor 26 is employed to effect the adjustment, but the fine adjustment is completed by means of the hand wheel 27.

After the bed A is properly adjusted and the motors of the machine are started, the work to be acted upon is deposited upon the travelling work support to be carried thereby through the machine successively beneath the two abrading units C.

The first unit, as stated, is equipped with a coarse abrasive and travels in a direction opposite to the direction of the work fed through the machine, but the second unit C which does the finishing, has a finer abrasive and travels with the direction of work feed.

The work, as it leaves the second abrading unit, is dusted or cleaned by the brush 151 and the work supporting travelling bed has its surface cleaned by means of the brush 157.

The abrasive surface is kept clean during the operation of the machine by means of the nozzles which travel back and forth across the width of the abrasive belts and project needle-like streams of air under pressure onto the abrasive surface. The material removed from the surface in this manner, as well as that incidental to the abrasive action on the work being conveyed through the machine, is drawn off through the suction ducts 186.

It is observed that the drive for the movable work supporting bed is separate from that of the abrading units and that each abrading unit has its own drive motor. Consequently, the machine may be operated with but one abrading unit if so desired.

The operation of the abrading units is particularly novel in that the abrading belts are not continuously pressed down into contact with the work being carried through the machine, but are intermittently held against the work at spaced areas. This intermittent engagement of the abrading belt with the work carried through the machine is effected by the vibratory pressure shoes and as hereinbefore brought out, precludes inter alia, the formation of objectionable long scratches on the surface of the work.

From the foregoing description, taken in connection with the accompanying drawings, it will be readily apparent to those skilled in the art to which an invention of the character described appertains, that I provide an abrading machine of novel and highly practical construction, in which a work feed of greatly increased speed is possible, and in which marring of the work is precluded.

What I claim as my invention is:

1. In an abrading machine, a work support, an endless flexible abrasive element of predetermined length and having one stretch movable across the work support, power means to drive the abrasive element so as to give the same a definite high linear speed of travel, pressure means to effect operative engagement between the abrasive element and work carried by said support, and power means to drive the pressure means so as to effect a rapid intermittent operative engagement of the abrasive belt with the work at a definite rate of succession so proportioned to the length of the abrasive belt and its linear speed of travel that any one given area of the abrasive belt can be held in operative engagement with the work only at widely spaced time intervals and then during only a very slight distance of travel of the abrasive belt so as to preclude the formation of long scratches in the work.

2. In an abrading machine, a work support, a flexible abrasive element movable across the work support, power means to drive the abrasive element so as to give the abrasive element a definite high linear speed of travel, pressure means for operatively engaging the abrasive element at spaced areas with work carried by said support, and power driven means for vibrating said pressure means simultaneously in opposite directions at a high rate of speed definitely proportional to the linear speed of the abrasive element so as to rapidly and intermittently apply pressure to the abrasive element to effect its operative engagement with the work in such a manner as to preclude the formation of long scratches in the work.

3. In an abrading machine, a work support, a moving flexible abrasive element, spaced pressure means for pressing spaced areas of the abrasive element against work carried by said support, and power means for simultaneously and oppositely vibrating said spaced pressure means during operative engagement between the abrasive element and the work.

4. In an abrading machine, a work support, a moving endless flexible abrasive element, and power driven automatic vibratory means for rapidly vibrating the abrasive element into and out of engagement with work carried by said support.

5. In an abrading machine, a work support, a substantially flexible abrasive element, means for moving the abrasive element over the work support, and a power driven vibrating shoe for intermittently engaging the abrasive element with work carried by said support.

6. In an abrading machine, a work support, a substantially flexible abrasive element, means for moving the abrasive element over the work support, and power driven vibrating means movable toward and from the work support for effecting a flat engagement between the abrasive element and work carried by the support alternately at spaced areas.

7. In an abrading machine, a work support, a substantially flexible abrasive element movable over the work support, and power driven automatic rapidly vibratory means movable substantially perpendicular to the abrasive element for engaging the abrasive element with work carried by said support with a flat contact for short periods of time in quick succession.

8. In an abrading machine, a work support, a substantially flexible abrasive element, power means for moving the abrasive element over the work support, pressure means for effecting an operative flat engagement of the abrasive element with work carried by the support, and power driven means to rapidly vibrate the pressure means toward and from the work support while the abrasive element is in operative engagement with the work so that no portion of the abrasive element is held in operative engagement with the work longer than a fraction of a second.

9. In an abrading machine, a work support, a moving endless flexible abrasive element movable over the support and adapted for engagement with work carried thereby, a pressure applying element engaging said abrasive element, and automatic operable means for intermittently and rapidly moving the pressure applying element toward and away from the work support to rapidly vibrate the abrasive element into and out of engagement with work carried by said support.

10. In an abrading machine, a work support, a substantially flexible abrasive element movable over the support, a pressure applying element for engaging the abrasive element with work carried by said support, and comprising cooperating members having flat surfaced portions engageable with the abrasive element, eccentric means mounting said cooperating members for simultaneous and opposite reciprocation, and means to automatically actuate the eccentric means.

11. In an abrading machine, a work support, a substantially flexible abrasive element movable over the work support, an automatically operable power driven vibratory pressure applying element movable toward and from the work support to intermittently engage the abrasive element with work carried by said support, and means providing micrometer adjustment for the vibratory pressure applying element with respect to the work support to regulate the degree of pressure imposed on the work through the abrasive element.

12. In an abrading machine, a work support, an abrasive element movable over the work support, pressure applying shoes for engaging the abrasive element with work on said support, bearings carried by said pressure applying shoes, a revolvable shaft extended through said bearings, and eccentrics on said shaft and journalled in said bearings to reciprocate the pressure applying shoes upon revolution of the shaft.

13. In an abrading machine, a work support, an abrasive element movable over the work support, a pressure applying element for intermittently engaging the abrasive element with work carried by said support, a bearing on said pressure applying element, a shaft having an eccentrically offset portion journalled in said bearing, means for revolving the shaft, and means for holding the pressure applying element against rotation about the shaft whereby the shaft revolution reciprocates said pressure applying element to effect intermittent engagement of the abrasive element with work.

14. In an abrading machine, a work support, a substantially flexible abrasive element movable over the work support, means for holding the abrasive element against work carried by the support comprising side by side pressure applying shoes, aligned bearings carried by said pressure applying shoes, a revolvable shaft extending through said aligned bearings, eccentrics carried by the shaft and journalled in said bearings, and means for holding the pressure applying shoes against rotation about the axis of said shaft whereby revolution of the shaft imparts reciprocating motion to the pressure applying shoes.

15. In an abrading machine, a work support, a substantially flexible abrasive element, a pressure applying element engaging said abrasive element, and common means for mounting said pressure applying element and vibrating the same towards and from the work support to engage the abrasive element with work carried by the said support for short periods of time in quick succession.

16. In an abrading machine, a power driven vertically vibrating pressure applying element, an abrasive element, means for moving the abrasive element horizontally across the vibrating pressure applying element, and means for carrying work past said pressure applying element to be acted on by the abrasive element.

17. In an abrading machine, a traveling work support for carrying work through the machine, a plurality of spaced substantially axially parallel rolls mounted above the traveling work support, an endless belt trained about said rolls having an external abrasive surface, and rapidly vibrating means independent of said rolls for intermittently engaging the abrasive surface of the belt with work being passed through the machine.

18. In an abrading machine, a work support, a substantially flexible abrasive element movable over the work support, means for holding the abrasive element against work carried by said support and comprising side by side pressure applying shoes, bearings carried by said pressure applying shoes, a revolvable shaft extending through said bearings, diametrically opposite eccentrics carried by said shaft and journaled in said bearings, and means for holding the pressure applying shoes against rotation about the axis of said revolvable shaft, whereby revolution of the shaft reciprocates the pressure applying shoes simultaneously in opposite directions to alternately engage the same with the abrasive element.

19. In an abrading machine, a work support, an abrasive element movable over the work support, means for intermittently engaging the abrasive element with work carried by said support and comprising side by side pressure applying shoes, bearings on said shoes, a revolvable shaft extending through said bearings, eccentrics on said shaft and journalled in said bearings, a support for the shaft, and means carried by said support and engageable with the pressure applying shoes to hold the same against rotation about the shaft whereby revolution of the shaft reciprocates the pressure applying shoes simultaneously and in opposite directions to alternately apply pressure on the work through the abrasive element.

20. In an abrading machine, a substantially flexible abrasive element, means for intermittently engaging the abrasive element with work carried therepast comprising side by side pressure applying shoes, bearings on the pressure applying shoes, a revolvable shaft extended through the bearings, diametrically opposite eccentrics on said shaft and journalled in the bearings, an adjustable support for the shaft, anti-friction means carried by said support and disposed between the pressure applying shoes to hold the pressure applying shoes against rotation about the shaft, whereby revolution of the shaft reciprocates the shoes simultaneously and in opposite directions, and means for maintaining the pressure applying shoes in engagement with said anti-friction means.

21. In an abrading machine, a flat work support, an abrasive belt movable over the work support, and a power driven vibratory pressure applying element extending substantially across the width of the belt and movable towards and away from the work support to effect an intermittent vibratory flat engagement between the abrasive belt and work carried by said support during operating engagement between the abrasive belt and the work.

22. In an abrading machine, a movable abrasive belt, a flat movable work support arranged to carry work past the abrasive belt, a vibratory pressure applying element extending substantially across the width of the belt, power driven means to rapidly vibrate said pressure applying element towards and from the work support to effect a flat engagement of the abrasive belt with the work for short periods of time alternately at spaced areas, means mounting said vibratory pressure applying element for bodily movement with its driving means toward and away from the flat work support, and means for effecting a micrometer adjustment of the vibratory element with respect to the work support while the vibratory pressure applying means is in operation.

23. In an abrading machine, a work support, a substantially flexible abrasive element movable over the work support, pressure applying shoes engageable with the abrasive element, bearings carried by the shoes, a revolvable shaft extending through the bearings, eccentrics on the shaft and journalled in the bearings to reciprocate the pressure applying shoes simultaneously in opposite directions, means mounting the shaft for movement toward and away from the work support, means for moving the shaft, and means for driving the shaft including a gear revolvable about an axis disposed in a plane substantially bi-secting the range of adjustment of the shaft toward and away from the work support, and a gear fixed to said shaft and meshing with said first mentioned gear.

24. In an abrading machine, an abrasive unit comprising an endless belt having an abrasive surface, a plurality of spaced rolls about which said belt is trained, means mounting one of the rolls for movement away from the others to tighten the belt, means for maintaining a constant outward pressure at both ends of said roll to maintain the belt tight irrespective of any variation in the length of its side edges, and differential means for adjusting the position of the roll to maintain an equal tension at both side edges of the belt.

25. In an abrading machine, an endless belt having an abrasive surface adapted for engagement with work, a plurality of rolls about which the belt is trained, means mounting one of the rolls for independent movement of its ends toward and away from the other rolls, means for adjusting said roll to tighten the belt, said means including differential gearing to enable the roll to adjust itself to the belt and compensate for variations in the length of the belt at its opposite edges, and means for rendering the differential gearing inoperative.

26. In an abrading machine, an endless belt having an abrasive surface for operative engagement with work to be acted upon, a plurality of spaced rolls over which the belt is trained, said rolls being arranged with one positioned above the others, means for moving said top roll in a substantially vertical plane toward and away from the other rolls to adjust the tension of the belt, said means including differential gearing whereby the roll is free to tilt and adjust itself to any variations in the length of the belt at opposite edges, and means for swinging one end of said roll in a plane at an angle to the substantially vertical plane of movement of the roll during the adjustment of the belt tension, to offset any tendency of the belt to climb off the high end of the roll.

27. In an abrading machine, an endless belt having an abrasive surface, a plurality of spaced rolls over which the belt is trained, one of said rolls being movable to adjust the tension on the belt, and means for adjusting the roll including differential gearing whereby any variation in the length of the belt at its side edges is accommodated.

28. In an abrading machine, an endless belt having an abrasive surface, a plurality of rolls over which the belt is trained, one of said rolls being movable with respect to the others to adjust the tension of the belt, means for maintaining a constant tension at both edges of the belt, and means including differential gearing for simultaneously and equally adjusting the tension at both edges of the belt irrespective of a difference in length at said edges.

29. In a machine of the character described, side members of different heights so that one projects above the other, a work support between the side members, an abrading unit above the work support and adapted to act on work carried by said support and comprising an endless belt having an abrasive surface, a plurality of rolls over which the belt is trained, a frame carried by the projecting portion of the higher side member for supporting the rolls, and detachable means for supporting the free end of said frame.

30. In an abrading machine, a base including upright side members of different heights, a traveling work support mounted between the side members and adapted to carry work through the machine, an abrading unit including spaced rolls and an endless abrasive belt trained about the rolls disposed above the traveling work support for operative engagement with work carried through the machine by the support, means rotatably supporting said rolls from the higher of the two side members and above the top of the other side member whereby the endless belt is movable sidewise from the rolls, and removable means for connecting the roll support with the shorter of the two side members.

31. In an abrading machine, a base including spaced upright side members of different heights, a travelling work support arranged between the side members and adapted to carry work through the machine, an abrasive unit disposed above the work support for operative engagement with work passed through the machine, and comprising a plurality of spaced substantially axially aligned rolls, and an abrasive belt trained about said rolls, means rotatably mounting the ends of the rolls adjacent the higher of the two side members from said higher side member, a supporting frame rigidly carried by said higher side member and extending to the opposite ends of the rolls, and detachable means for connecting the outer end of said frame member with the shorter of the two side members.

32. In an abrading machine, a base including spaced supports of different heights, a work support between said spaced supports, an abrading unit above the work support for operative engagement with the work thereon and comprising a plurality of spaced rolls, and an endless belt trained thereabout, means for rotatably mounting one end of the rolls from the higher of the two spaced supports and above the top of the shorter of the two spaced supports, a frame connected with said higher spaced support and extending to the opposite ends of the rolls to rotatably support the same, and detachable means for rigidly connecting the outer end of said frame with the shorter of said spaced supports.

33. In an abrading machine, a base including spaced supports of different heights, a work support between said spaced supports, an abrading unit above the work support for operative engagement with the work thereon and comprising a plurality of spaced rolls and an endless belt trained thereabout, means for rotatably mounting one end of the rolls from the higher of the two spaced supports and above the top of the shorter of the two spaced supports, a frame connected with said higher spaced support and extending to the opposite ends of the rolls to rotatably support the same, detachable means for rigidly connecting the outer end of said frame with the shorter of said spaced supports, and means for adjusting said detachable means to insure parallelism between the rolls and the work support.

34. In an abrading machine, a plurality of spaced rolls, an abrasive belt trained about said rolls, supporting walls at the ends of the rolls, slide members mounted from the end walls for independent movement in a common plane and carrying bearings for one roll to move said roll toward and away from the other rolls to adjust the tension on the belt, means for moving said slide members to adjust the roll carried thereby, said means enabling the slide members to move independently of each other whereby the adjustable roll is free to adjust itself to the belt and compensate for a variation in length at the opposite edges of the belt, and means for moving one of said slide member carried bearings in a plane at an angle to said first mentioned plane to shift the roll sidewise and facilitate correction of a tendency toward improper belt traction.

35. In an abrading machine, an endless abrasive belt, a roll over which the belt travels, and means mounting said roll for movement to adjust the belt tension and to correct a tendency toward improper belt trackage, comprising slide members, a bearing fixed to one slide member and rotatably receiving the adjacent end of the roll, a second bearing rotatably receiving the opposite end of the roll, means mounting said second bearing for transverse movement on the other slide member, means carried by said other slide member for shifting the second mentioned bearing transversely with respect to said slide member to shift one end of the roll sidewise, and means for moving the slide members to carry the roll bodily toward and away from the belt.

36. In an abrading machine, an abrasive belt, means for moving the abrasive belt over a surface to be abraded, side by side pressure shoes extending across the width of the belt, means for reciprocating said shoes simultaneously in opposite directions to intermittently hold the abrasive belt against the surface in flat engagement therewith at spaced areas, and an anti-friction pad extending across the width of the belt engaging portions of both pressure shoes.

37. In an abrading machine, an abrasive belt movable over a surface to be abraded, side by side pressure shoes extending across the width of the belt, means for vibrating the shoes in a direction substantially perpendicular to the surface of the belt to intermittently operably engage the belt with the work surface at spaced areas, an anti-friction covering extending across the belt engaging surfaces of both pressure shoes to preclude wear on the abrasive belt, and means for readily detachably securing one edge of the covering to one of the pressure shoes and the other edge of the covering to the other pressure shoe.

GUSTAVE T. JOHNSON.